United States Patent
Hu et al.

(10) Patent No.: US 8,164,881 B2
(45) Date of Patent: Apr. 24, 2012

(54) POROUS CARBON ELECTRODE WITH CONDUCTIVE POLYMER COATING

(75) Inventors: Yong-Sheng Hu, Stuttgart (DE); Yu-Guo Guo, Stuttgart (DE); Lizhen Fan, Stuttgart (DE); Joachim Maier, Wiernsheim (DE); Philipp Adelhelm, Freiberg (DE); Bernd Smarsly, Potsdam (DE); Markus Antonietti, Bergholz-Rehbruecke (DE)

(73) Assignee: Max-Planck-Gesellschaft zur Foerderung der Wissenschaften e.V., Munich (DE)

( * ) Notice: Subject to any disclaimer, the term of this patent is extended or adjusted under 35 U.S.C. 154(b) by 523 days.

(21) Appl. No.: 12/302,758

(22) PCT Filed: May 25, 2007

(86) PCT No.: PCT/EP2007/004697
§ 371 (c)(1),
(2), (4) Date: Aug. 28, 2009

(87) PCT Pub. No.: WO2007/137794
PCT Pub. Date: Dec. 6, 2007

(65) Prior Publication Data
US 2010/0008021 A1    Jan. 14, 2010

(30) Foreign Application Priority Data

May 31, 2006 (EP) .................................. 06011198
Sep. 8, 2006 (EP) .................................. 06018886
Sep. 15, 2006 (EP) .................................. 06019348

(51) Int. Cl.
*H01G 9/00* (2006.01)
(52) U.S. Cl. ........ 361/502; 361/503; 361/504; 361/512; 361/516; 361/519
(58) Field of Classification Search ................. 361/502, 361/503–504, 509, 512, 516–519, 523–525
See application file for complete search history.

(56) References Cited

U.S. PATENT DOCUMENTS

| | | | | |
|---|---|---|---|---|
| 6,060,188 | A * | 5/2000 | Muthuswamy et al. | 429/494 |
| 6,998,149 | B2 * | 2/2006 | Kohler et al. | 427/115 |
| 7,871,739 | B2 * | 1/2011 | Tomita et al. | 429/531 |

* cited by examiner

*Primary Examiner* — Nguyen T Ha
(74) *Attorney, Agent, or Firm* — Kilpatrick Townsend & Stockton LLP

(57) ABSTRACT

An extremely high-performance polyaniline electrode was prepared by potentiostatic deposition of aniline on hierarchically porous carbon monolith (HPCM), which was carbonized from mesophase pitch. A capacitance value of 2200 F g$^{-1}$ of polyaniline was obtained at a power density of 0.47 kW kg$^{-1}$ and an energy density of 300 Wh kg$^{-1}$. This active material deposited on HPCM also has an advantageous high stability. These superior advantages can be attributed to the backbone role of HPCM. This method also has the advantages of not introducing any binder, thus contributing to the increase of ionic conductivity and power density. High specific capacitance, high power and energy density, high stability, and low cost of active material make it very promising for supercapacitors.

29 Claims, 11 Drawing Sheets

"non-graphitic carbon"  Graphite

2μm

1μm

Carbon monolith from mesophase pitch

| Samples | Surface area (m²/g) | Pore volume (cc/g) | Mesopore diameter (nm) | Macropore diameter (μm) | Stacking height (nm) | Layer size (nm) | H/C atomic ratio |
|---|---|---|---|---|---|---|---|
| 700°C | 330 | 0.55 | 6 | 1-4 | 1.3 | 1.1 | 0.257 |
| 850°C | 327 | 0.59 | 6 | 1-4 | 3.4 | 1.4 | 0.094 |
| 1000°C | 277 | 0.47 | 6 | 1-4 | 4.8 | 1.9 | 0.018 |
| 1500°C | 150 | 0.20 | 6 | 1-4 | 9.4 | 3.8 | --- |
| 2500°C | 61 | 0.13 | 4-12 | 1-4 | --- | --- | --- |

POROUS CARBON ELECTRODE WITH CONDUCTIVE POLYMER COATING

CROSS REFERENCE TO RELATED APPLICATIONS

This application is a National Stage of International Application No. PCT/EP2007/004697 filed May 25, 2007 and which claims the benefit of European Patent Applications Nos. 06011198.6, 06018886.9 and 06019348.9, the disclosures of all applications being incorporated herein by reference.

BACKGROUND OF THE INVENTION

The present invention relates to an electrode comprising a conductive carbon material especially for high performance applications, such as used in supercapacitors, and to methods of preparing such an electrode.

Supercapacitors have attracted great interest in the energy storage field because they complement batteries with respect to energy and power densities as is described by A. S. Arico, P. Bruce, B. Scrosati, J.-M. Tarascon, W. Van Schalkwijk, in *Nature Mater.*, 2005, 4, 366, and by R. Röz, M. Carlen, in *Electrochim. Acta*, 2000, 45, 2483. Supercapacitors have potential applications in hybrid transportation systems whenever high power densities are needed, e.g. in providing high power during acceleration, deceleration or braking. Based on the charge-storage mechanism, supercapacitors can be divided into two categories as described by B. E. Conway, in *Electrochemical Supercapacitors, Scientific Fundamentals and Technological Applications*, Kluwer Academic/Plenum Publishers, New York, 1997, and by A. Burke, in *J. Power Sources*, 2000, 91, 37. One of these categories is the electrical double layer capacitor (EDLC), where the capacitance arises from the charge separation at an electrode/electrolyte interface, e.g. at a carbon electrode. EDLC capacitors are for example described by E. Frackowiak, F. Béguin, in *Carbon*, 2001, 39, 937, by A. G. Pandolfo, A. F. Hollenkamp, in *J. Power Sources*, 2006, 157, 11, and by J. Chmiola, G. Yushin, Y. Gogoti, C. Portet, P. Simon, P. L. Taberna, in *Science*, 2006, 313, 1760. The other category is the redox capacitor, where the capacitance comes from Faradaic reactions at the electrode/electrolyte surface of e.g. transitional metal oxides or of electroactive polymers. Redox capacitors using transition metal oxides are described by K. H. Chang, Y. T. Wu, C. C. Hu, in *Recent advances in supercapacitors*. ed. V. Gupta, Transworld Research Network, Kerala, India, 2006, P30, by C. C. Hu, T. W. Tsou, in *Electrochem. Commun.*, 2002, 4, 105, by M. Wu, G. A. Snook, G. Z. Chen, D. J. Fray, *Electrochem. Commun.*, 2004, 6, 499, and by D. Choi, G. E. Blomgren, P. N. Kumta, in *Adv. Mater.*, 2006, 18, 1178. Redox capacitors using electroactive polymers are described by A. Rudge, J. Davey, I. Raistrick, S. Gottesfeld, J. P. Ferraris, in *J. Power Sources*, 1994, 39, 273, by A. Rudge, I. Raistrick, S. Gottesfeld, J. P. Ferraris, in *Electrochim. Acta*, 1994, 47, 89, and by C. Arbizzani, M. C. Gallazzi, M. Mastragostino, M. Rossi, F. Soavi in *Electrochem. Commun.*, 2001, 3, 16.

In EDLCs, the capacitance is proportional to the surface area of the electrode/electrolyte interface, so the performance is limited by the surface area of the electrode materials. Although theoretically surface areas as high as 2600 $m^2 g^{-1}$ can be achieved for nanoporous carbon, and thus specific capacitances of 400 $F g^{-1}$ can be obtained, this is not a realistic option from a cost point of view. Generally, for an activated carbon with a specific surface area of 1000 $m^2 g^{-1}$, the specific capacitance is 150 $F g^{-1}$, see C. Vix-Guterl, E. Frackowiak, K. Jurewicz, M. Friebe, J. Parmentier, F. Béguin, in *Carbon*, 2005, 43, 1293. In addition to the surface area, the composition in carbon materials is important as the introduction of heteroatoms in the carbon network gives rise to pseudocapacitive storage as described by F. Béguin, K. Szostak, G. Lota, E. Frackowiak, in *Adv. Mater.*, 2005, 17, 2380, by E. Raymundo-Piñero, F. Leroux, F. Béguin, in *Adv. Mater.*, 2006, 18, 1877, and by W. Li, D. Chen, Z. Li, Y. Shi, Y. Wan, J. Huang, J. Yang, D. Zhao, Z. Jiang, *Electrochem. Commun.*, 2007, 9, 569 (e.g. a high specific capacitance of 200 $F g^{-1}$ can be obtained by using carbon ($S_{BET}$=273 $m^2 g^{-1}$) doped with a high amount of oxygen).

Compared with EDLCs, redox capacitors exhibit higher specific capacitances; e.g. record values of ~982 $F g^{-1}$ and ~385 $F g^{-1}$ have been respectively obtained for hydrous $RuO_2$ (see O. Barbieri, M. Hahn, A. Foelske, R. Kötz, J. in *Electrochem. Soc.*, 2006, 153, A2049), and anhydrous nanoporous $RuO_2$ (see Y.-S. Hu, Y.-G. Guo, W. Sigle, S. Hore, P. Balaya, J. Maier, in *Nature Mater.*, 2006, 5, 713). However, the high cost of noble metal materials inhibits their commercial application. Relatively low cost materials such as $MnO_x$ can also be used as electrode materials, but the specific capacitances (~400 $F g^{-1}$) still need to be enhanced. This is described by T. Shinomiya, V. Gupta, N. Miura, in *Electrochim. Acta*, 2006, 51, 4412. Electroactive polymers have advantageous properties with respect to low cost, high conductivity, high doping/dedoping rate during charge/discharge processes as well as facile synthesis through chemical and electrochemical methods, such as described by A. Malinauskas, J. Malinauskiene, A. Ramanavicius, in *Nanotechnology*, 2005, 16, R51. However, they exhibit the disadvantage of a low cycle life because swelling and shrinkage may occur during doping/dedoping processes, thus leading to mechanical degradation of the electrodes and fading of the electrochemical performance as described by E. Frackowiak, F. Béguin, in *Recent advances in supercapacitors*. ed. V. Gupta, Transworld Research Network, Kerala, India, 2006, P79.

Over the years much attention has been paid to the synthesis of electrode materials with highly electroactive regions by controlling the microstructure (i.e. grain size, thickness, specific surface area and pore characters). Reference is made in this connection to M. D. Ingram, H. Staesche, K. S. Ryder, *Solid State Ionics*, 2004, 169, 51, and to L.-Z. Fan, J. Maier, in *Electrochem. Commun.*, 2006, 8, 937. Nanometer-sized electroactive materials with high porosities in contact with liquid electrolytes can exhibit enhanced electrode/electrolyte interface areas, providing highly electroactive regions and decreased diffusion lengths within active materials as described by Prof. J. Maier in *Nature Mater.*, 2005, 4, 805. The use of carbon nanotubes with exceptional conducting and mechanical properties as a support for active materials can not only increase the specific capacitance of active materials, but also relieve the cycle degradation problems caused by mechanical problems. This has been described by many authors, such as M. Hughes, M. S. P. Shaffer, N. C. Renouf, C. Singh, G. Z. Chen, D. J. Fray, A. H. Windle, in *Adv. Mater.*, 2002, 14, 382, by M. Hughes, G. Z. Chen, M. S. P. Shaffer, D. J. Fray, A. H. Windle, in *Chem. Mater.*, 2002, 14, 1610, by K. Jurewicz, S. Delpeux, V. Bertagna, F. Béguin, E. Frackowiak, in *Chem. Phys. Lett.*, 2001, 347, 36, by V. Khomenko, E. Frackowiak, F. Béguin, in *Electrochim. Acta*, 2005, 50, 2499, by V. Gupta, N. Miura, in *J. Power Sources*, 2006, 157, 616, by E. Frackowiak, V. Khomenko, K. Jurewicz, K. Lota, F. Béguin, in *J. Power Sources*, 2006, 153, 413, and by V. Gupta, N. Miura, in *Electrochim. Acta*, 2006, 52, 1721.

Up to now the highest specific capacitance reported for a polymer material application (PANI— polyaniline in a PANI/ carbon composite) is a capacitance per mass of PANI of 1221 F g$^{-1}$. There whisker-like PANI was grown on mesoporous carbon by a chemical polymerization method as described by Y.-G. Wang, H.-Q. Li, Y.-Y. Xia, in *Adv. Mater.*, 2006, 18, 2619.

SUMMARY OF THE INVENTION

A principle object underlying the present invention is to enhance the capacitive performance of active materials and to provide an improved electrode utilizing such materials.

In order to satisfy this object there is provided an electrode comprising a conductive carbon material of hierarchical porosity coated with an electrically conductive polymer.

In particular there is provided an electrode in which the porous electrically conductive carbon material includes graphene stacks and has first and second pores in first and second different pore size ranges respectively, wherein the first pores are of irregular shape in three dimensions, are interconnected to form transport passages through the carbon material and have sizes in the size range from 10 μm to 100 nm, wherein the second pores are defined between neighboring graphene stacks, are of irregular shape in three dimensions, are interconnected, communicate directly or indirectly via other second pores with the first pores and have sizes in the size range from less than 100 nm to 3 nm and wherein the graphene stacks defining the second pores form wall material between the first pores.

In such an electrode, a majority of the second pores in the porous carbon material have sizes before coating with the electrically conductive polymer in the range from 50 nm to 3 nm, and particularly from 3 nm to 8 nm.

In the porous carbon material, a majority of the first pores have sizes in the range from 5 μm to 500 nm, and particularly in the range from 2 μm to 500 nm.

Moreover, in the porous carbon material, the total pore volume comprising micropores with a volume less than 3 nm, the second pores in the size range from less than 100 nm to 3 nm and the first pores in the size range from 10 μm to 100 nm lie in the range from 0.1 to 1.0 cc/g.

Furthermore the total pore volume in the porous carbon material before coating lies in the range from 0.40 cc/g to 0.65 cc/g with the volume of second pores (8) lying in the range from 0.35 cc/g to 0.55 cc/g and the volume of the first pores lying in the range from 0.05 cc/g to 0.1 cc/g.

The ratio of the total pore volume of the second pores to the total pore volume of the first pores usefully lies in the range from 2 to 12.

The porous carbon material preferably has a BET surface in the range from 50 m$^2$/g to 800 m$^2$/g, especially from 250 m$^2$/g to 350 m$^2$/g, and particularly of around 350 m$^2$/g.

Moreover, the porous carbon material usefully has an H/C atomic ratio in the range from 0.3 to 0.01 and preferably in the range from 0.2 to 0.075 and especially of about 0.1.

Also according to the present invention there is provided, in a first embodiment, a method of manufacturing such an electrode of a carbon material having a hierarchical porosity by carbonizing a carbon monolith precursor having a porosity generating fugitive phase dispersed therein, the fugitive phase comprising particles in at least first and second size ranges, the first size range being from 10 μm to 100 nm and the second size range being from less than 100 nm to 1 nm, subsequently removing the fugitive phase to form a porous carbon monolith having hierarchical porosity with pores in the size ranges and subsequently depositing a conductive polymer on the carbon material having a hierarchical porosity.

According to a second alternative embodiment of the method there is provided a method of manufacturing such an electrode of a carbon material having a hierarchical porosity by:

manufacturing a mixture containing at least one carbon precursor and an organic polymer in an organic solvent, vaporizing the solvent until a viscous or highly viscous composition of a corresponding shaped body is obtained, shaping the viscous composition into a shaped body, heating the composition of the shaped body to a temperature between 600° C. and 1000° C. to form a porous carbon monolith having hierarchical porosity with pores in the size ranges and wherein a conductive polymer is subsequently deposited on the carbon material having a hierarchical porosity.

Surprisingly, it has namely been found that an electrically conductive carbon material of hierarchical porosity, as described in the not prior published European Patent Applications 06011198.6 of May 31, 2006 and 06019348 of Sep. 15, 2006, which also has good electrical conductivity, is surprisingly well-suited for use in supercapacitors when coated with a conductive polymer, especially PANI. More specifically, particular benefits have been found in an electrode material produced by electrodeposition of an electroactive polymer (here PANI) onto hierarchically porous carbon monoliths (hereinafter abbreviated as HPCM). HPCM is chosen here because it can be used as both a current collector and a high surface support for conducting polymers, thus enabling an intimate contact between the active material and the current collector. Carbon monoliths with large sizes and tailored porosities prepared using parent templates and precursors are much easier to handle than powdered carbon (e.g. activated carbon and carbon nanotubes). Unlike powdered carbon materials, no binder is required and no additional conductive agent (e.g. carbon black) has to be added when preparing the electrode. Introducing binder into the electrode is prone to decrease the overall conductivity of the electrode, and hence power density. Surprisingly, the limited material volume surrounding the pore spaces (e.g. mesopore diameter is ~7 nm) in HPCM has been found to limit the grain growth of active materials, thus leading to a high specific capacitance. As a porous support, the network of comparatively large pore sizes can render the electrolyte diffusion into the bulk of the electrode material more easily and hence provide fast transport channels for the conductive ions.

At this stage it is useful to consider carbon materials with hierarchical porosity in more detail. The term "hierarchical porosity" will be understood to mean carbon materials having pores of at least two different sizes and in particular first pores in a size range from 10 μm to 100 nm and second pores in a size range from less than 100 nm to 3 nm.

Porous carbon materials are a well-known class of substances. They are widely used, mainly in the form of a grain-like powder frequently known by the name of "activated carbon", for example as sorbents for the cleaning and clarification of aqueous media, for filters and gas masks, for air conditioning units, etc., as well as for a catalyst support or as an electrode material. More visionary fields of use are the storage of gas (e.g. H$_2$ or methane), the use as a conductive reactive membrane, for example in a fuel cell, or in so-called "supercapacitors".

In practically all known systems the transport system formed by the porous structure, which is essential for the characteristics, and also the chemical and the physical functionality, which is advantageous in use, is achieved purely empirically by the selection of starting products, by calcination and frequently also by a subsequent "activation". By way of example, high performance absorbers, such as "Helsatech®", are produced in the technical field by the pyrolysis of ion exchange resins.

Attempts have been made to achieve carbon material structures with a rationally designed porosity. A first route was pioneered by Ryoo, see for example the article by Ryoo, R. S. H. Joo and S. Jun, "Synthesis of highly ordered carbon molecular sieves via template-mediated structural transformations", *Journal of Physical Chemistry B*, 1999, 103(37): p. 7743-7746, and Kruk, M., Ryoo, R., et al., Characterization of ordered mesoporous carbons synthesized using MCM-48 silicas as templates, *Journal of Physical Chemistry B*, 2000, 104(33): p. 7960-7968. This concept was subsequently refined by Schuth, see for example Lu, A. H., Schuth F. et al., Synthesis of ordered mesoporous carbon with bimodal pore system and high pore volume, *Advanced Materials*, 2003, 15(19): p. 1602-+, and Lu, A. H., Schmidt, W. and Schuth, F., Simplified novel synthesis of ordered mesoporous carbon with a bimodal pore system, *New Carbon Materials*, 2003, 18(3): p. 181-185.

This first method is based on the "nanocasting" of silicate structures. For this, grainy zeolite structures or mesoporous silicate monoliths were used. It was found that large surfaces (up to 2050 m$^2$/g) can be combined with a readily accessible mesoporous channel system. All these carbon materials are, however, so designed that they are not electrically conductive or only weakly electrically conductive. That is to say, they consist in large part of amorphous carbon. They are not therefore suitable for use as conductive carbon material. So far as is known, electrically conductive structures have not been manufactured in this way because the graphitizing temperatures that are required of greater than 2000° C. for the carbon precursors, which have hitherto been used, result in the pore structure being broken down again in large part.

At this stage, reference should be made to the published U.S. Patent Application 2005/0169829 A 1, which is concerned with providing a robust carbon monolith characterized by a skeleton size of at least 100 nm with a hierarchical pore structure having macropores and mesopores. This structure is proposed for use in a chromatography column and the disclosure of the US reference is heavily weighted towards such use of the carbon monolith. There is, however, a brief mention to the effect that the monolithic carbon column can be used as a porous electrode for any electrochemical system. This is, however, not explained in any further detail. In the methods that are described there a carbon monolith precursor, which is defined as any material that can be carbonized to form a carbon monolith that can be used for chromatographic separation, has to include a particulate, porosity generating fugitive phase, which serves as a template for the pores that characterize the final product.

In one method, silica beads sized from 800 nm to 10 μm and from 6 nm to 100 nm are dispersed in a solvent in a concentration range of 0.1 to 2 g/g using an appropriate dispersing method such as ultrasonic mixing, for example to form a colloid. FeCl$_3$ is then dissolved into the colloid in a concentration range of 0.01 to 0.5 g/g and resorcinol is then dissolved into the colloid in a concentration of 0.1 to 2.5 g/g. The colloid is then agitated to facilitate a reaction to form a resorcinol/Fe (III) complex. Formaldehyde is then added and stirred to achieve homogeneity. The colloid is then transferred into a mold of desired monolith shape and heated to a temperature in the range from about 50° C. to 95° C. for a period of between 0.5 hour to 20 hours to effect polymerization of the colloid into a solid monolith, shrinkage of the monolith from the mold wall and curing of the monolith. The solid monolith is then removed from the mold and the solvent evaporated to dryness. The dry monolith is then cured at a temperature in the range of about 40° C. to 150° C. for a time period of 3 hours to 20 hours to effect complete polymerization of the monolith material.

In an alternative method, polystyrene beads are used instead of silica beads. In variants of the method, silica beads of two discrete different particle sizes are used, for example larger particles in the range from 800 nm to 10 μm and smaller particles in the range from 6 nm to 100 nm. The carbon monolith precursors prepared by the above methods are subsequently carbonized and graphitized through a programmed temperature cycle, e.g. using a slow rise in temperature from room temperature to 750° C. followed by a fast temperature ramp to a temperature of up to 2400° C. or higher to graphitize the carbonized rods.

By varying the pore-forming agents, the sizes for macropores and mesopores can be finely adjusted within the limits described above. The result is a morphology of the carbon material involving a skeleton having macropores of various sizes forming the primary porosity of the carbon monolith. A secondary phase separation results in the secondary porosity on the carbon skeleton.

Another approach to manufacturing monolithic porous carbon materials lies in first manufacturing monolithic porous oxides, for example monolithic silicate columns, available from the company Merck under the designation "Chromolith", or round monolithic silicate discs prepared in accordance with the teachings of Minakuchi and Tanaka, see for example Minakuchi, H., Tanaka, et al., Performance of an octadecylsilylated continuous porous silica column in polypeptide separations, in *Journal Of Chromatography A*, 1998, 828(1-2): p. 83-90.

The corresponding monolithic silicate components, for example with a height of 0.5 cm and a diameter of 2.5 cm, can be taken as a starting point for the preparation of the carbon material with hierarchical porosity as used for the present invention. They were first impregnated with a special carbon precursor and were then carefully carbonized in the presence of the silicate. Thereafter, the silicate was removed, for example using fluorides or NaOH, so that a carbon monolith in the form of a negative replica of the silicate structure resulted. By appropriate choice of the starting product, for example in the form of "mesophase pitch", and also the addition of further porogenes, it was possible to generate a monolithic carbon material which has pores being in first and second different size ranges, in particular first pores having sizes between 10 μm and 100 nm and second pores having sizes in the range from less than 100 nm to 3 nm, the material being in the form of non-graphitic carbon.

Monolithic carbon materials have indeed already been synthesized by this process as can be read in the following articles:

Yang, H. F., et al., Synthesis of ordered mesoporous carbon monoliths with bicontinuous cubic pore structure of Ia3d symmetry, *Chemical Communications*, 2002, (23): p. 2842-2843;

Shi, Z. G., et al., Synthesis of a carbon monolith with trimodal pores, *Carbon*, 2003, 41(13): p. 2677-2679; and Lu, A. H., J. H. Smatt, and M. Linden, Combined surface and volume templating of highly porous nanocast carbon monoliths, *Advanced Functional Materials*, 2005, 15(5): p. 865-871.

However, the monoliths manufactured in this way were often less stable and consisted, as a result of other precursors, all of amorphous carbon.

It has surprisingly been found that carbon materials can be made using similar techniques to those described in US 2005/

0169829 A1 and by other methods, but using comparatively low temperatures, which results in materials having a very different structure and characteristics such that rationally designed porous non-graphitic carbons are produced which have an excellent charge capacity and an extremely high rate charge/discharge characteristic, dependent on the carbon precursor that is used and on the heat treatment temperature that is used.

It is particularly beneficial to use a carbon material in which the carbon material has been heat treated at a temperature in the range from 600° C. to 1000° C.

The carbon material preferred for the present invention has first pores in the size range from 10 μm to 100 nm and second pores in the size range from less than 100 nm to 3 nm, a specific surface area in the range from 50 m$^2$/g to 800 m$^2$/g, especially of around 300 m$^2$/g, and a pore volume in the range from 0.3 to 1.0 cm$^3$/g.

More specifically, the preferred carbon material used for the present invention is present in the form of non-graphitic carbon comprising a plurality of randomly oriented graphene stacks having stack heights in the range from 2 to 30 nm and lateral extension values $L_A$ in the range from 2 to 8 nm, the graphene stacks either contacting one another or being separated by amorphous carbon usually distributed in the structure between the graphene stacks and present in a total amount relative to the graphene stacks of less than 10% by weight.

The amorphous carbon material present between some of the graphene stacks consists of sp3 carbon and can be thought of as mortar between randomly oriented and irregularly shaped bricks, either in form of thin layers (less than 2 nm on average) or also isolated species such as CH or CH2 containing units.

The carbon material of the invention seems to be such that the first pores are on the micrometer scale, separated by micrometer sized walls (1-10 micrometer). The second pores are located within these thick walls, and their walls are defined by graphene stacks.

Starting from a so-called non-graphitic carbon such as mesophase pitch, it has been found that heat treatment at a temperature in the range from 600° C. to 1000° C. and preferably of not more than 950° C. results in graphene stacks being formed of a height $L_c$ in the range from 1.3 to 2.0 nm and lateral extension $L_A$ values in the range from 1.0 to 1.89 nm.

The term "stack height" or "stacking height" for $L_c$ as used above means the height of the layers of graphene stacked on top of each other. The term "lateral extension $L_A$" has the usual meaning attributed to it in the carbon community. The more ordered the non-graphitic carbon is, the higher are $L_c$ and $L_A$. The values for $L_c$ and $L_A$ of the present materials are significantly higher than for other precursors treated to temperatures in the same range. For instance, when furfuryl alcohol or sugar are used and are heated to a temperature in the same range, then they produce lower stacking heights below 1 nm and $L_A$<1 nm. Graphitization, which is undesirable for the purpose of the present invention, can only be achieved at heat treatment temperatures above 2000° C.

The carbon material can be made by carbonizing a carbon monolith precursor having a porosity generating fugitive phase dispersed therein, the fugitive phase comprising particles in first and second size ranges, the first size range being from 10 μm to 100 nm and the second size range being from less than 100 nm to 3 nm, and by subsequently removing the fugitive phase to form a porous carbon monolith having first and second pores in the same size ranges.

In an alternative embodiment a carbon material is used which is made by manufacturing a mixture containing at least one carbon-containing material and an organic polymer in an organic solvent, by vaporizing the solvent until a viscous or highly viscous composition of a corresponding shaped body is obtained and by heating the composition of the shaped body to a temperature between 600° C. and 1000° C. The carbon-containing material or carbon precursor is preferably mesophase pitch and the organic polymer is preferably polystyrene.

BRIEF DESCRIPTION OF THE DRAWINGS

The invention will now be described in more detail with reference to examples and to the accompanying drawings.

DESCRIPTION OF THE PREFERRED EMBODIMENTS

Figure 1A:
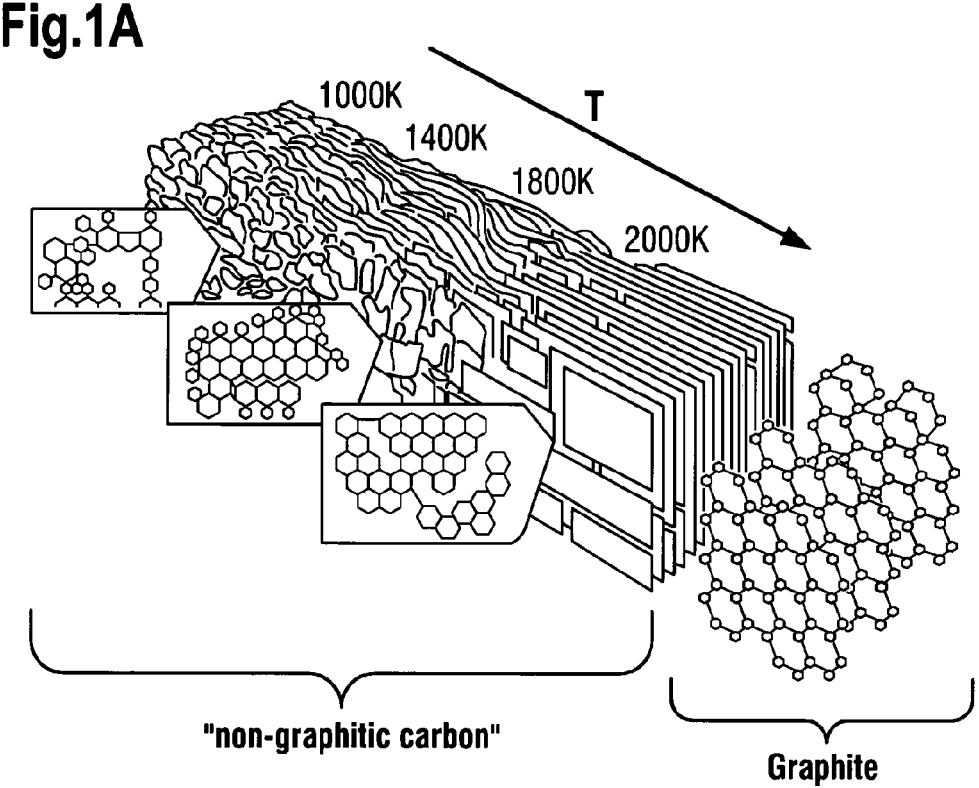
FIGS. 1A and 1B show diagrams illustrating the concept of non-graphitic carbon and the non-graphitic carbon structure useful for the present invention.
Figure 1B:
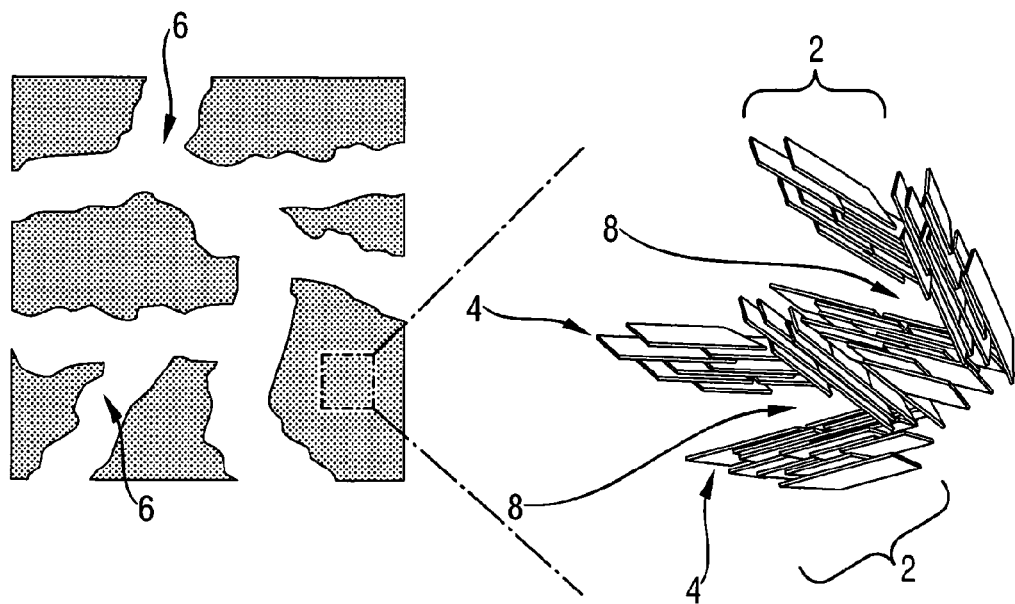

Turning first of all to FIGS. 1A and 1B, the non-graphitic carbon material underlying the present invention will first be described. FIG. 1A shows, in the diagram at the top left, how the structure of non-graphitic carbon changes as it is subjected to heat treatment (pyrolysis) at different temperatures. It can be seen from this diagram that in the temperature range of 600° C. to 1000° C. to which the present invention relates, i.e. 873 to 1273 K, the structure comprises a plurality of randomly oriented small graphene stacks 2. The stacks themselves comprise sheets 4 of carbon atoms arranged in a generally hexagonal arrangement. Each sheet 4 shown as a rectangle in FIG. 1B is termed a graphene. The carbon atoms in each graphene have no positional correlation with the position of carbon atoms in the graphenes below and above.

As the heat treatment temperature increases, the non-graphitic carbon becomes progressively more ordered and, at a temperature above 2273° K, i.e. 2000° C., is converted into graphite, i.e. a crystalline form of carbon.

The graphene stacks in the temperature range of interest and for a material having first and second pore sizes in the ranges 10 μm to 100 nm and less than 100 nm to 3 nm are shown to an enlarged scale in FIG. 1B. The graphene stacks have stack heights in the range from 2 to 30 nm and lateral extension values $L_A$ in the range from 2 to 8 nm. The graphene stacks either contact one another or are separated by amorphous carbon usually distributed throughout the structure between the graphene stacks and present in a total amount relative to the graphene stacks of less than 10% by weight.

As can be seen in FIG. 1B the first pores 6 are separated by micrometer-thick walls, which themselves contain the second pores 8. The second pores 8 are defined between neighboring graphene stacks 2. This structure has the particular advantage that lithium atoms can readily move into and out of the structure and this contributes to the outstanding properties of the carbon material as an electrode in a lithium-ion battery. More specifically, it has been found that in such non-graphitic carbon material made from mesophase pitch the second pores 8 have an almost ideal size in the range 3 to 8 nm and that relatively few pores with a size less than 3 nm are present, and this is extremely favorable in a supercapacitor or in a lithium-ion battery, which can also be made using the carbon material with hierarchical porosity proposed herein.

This range for the preferred size of the second pores 8, i.e. 3 nm to 8 nm, also applies to uses of the carbon material in applications other than lithium batteries. E.g., it is also a beneficial size range for a carbon material used as a support for a coating. Because the carbon material is porous the coating consisting of an electrically conductive polymer is present on the carbon surfaces within the pores. This can be considered as "internal coating" or as "loading" because the material involved is distributed in the porous carbon in three dimensions. Generally speaking, the range for the sizes of the second pores can extend from 3 nm to under 100 nm, with the range from 3 nm to 50 nm being preferred and the range from 3 nm to 8 nm being particularly preferred. What these size ranges mean is that the majority of the pores, which are of generally irregular shape, have an average size generally at the middle of the range. Thus there are finer and coarser pores within the size range on either side of the average size and indeed there can be finer and coarser pores outside of the size range. For the size ranges quoted above for the second pores, finer pores lying outside of the size range are not normally desirable but frequently unavoidable. Larger pores outside the size range for the second pores fall within the size range given for the first pores and can have utility within this range even if they are not preferred for the transport mechanisms associated with the pores in the first, larger, size range. The distribution of the pore sizes of the pores in the second size range cannot be specified more closely with reference to a particular shape of the pore size distribution because this distribution does not necessarily correspond to a standard distribution, such as a normal or Gaussian distribution. Generally speaking, about 80% of the pores will have sizes in the preferred range, with the remaining 20% having sizes outside of the preferred range, but within the total range quoted. Thus, for the preferred size range of 3 nm to 8 nm, 80% of the second pores will have sizes in this range and will have an average size of 5.5 nm. Some pores will be smaller down to the minimum useful size of about 3 nm and some will be larger up to the maximum useful size of just under 100 nm. As noted above, this definition does not mean that pore sizes below 3 nm are precluded. Indeed there can easily be a relatively large number of pores with pores sizes below 3 nm, they are just not important for the applications envisaged. Generally speaking, pores with a pore size under 3 nm can have a total volume which amounts to about 10% of the total pore volume of pores in the second size range. The smaller this percentage the better, since it means there is a higher proportion of the good second pores with a size in the range 3 nm to just under 100 nm.

The question also arises as to what is understood by an average pore size for pores that have an irregular shape and are indeed largely interconnected so that they form irregular channels in three dimensions.

Figure 3A:
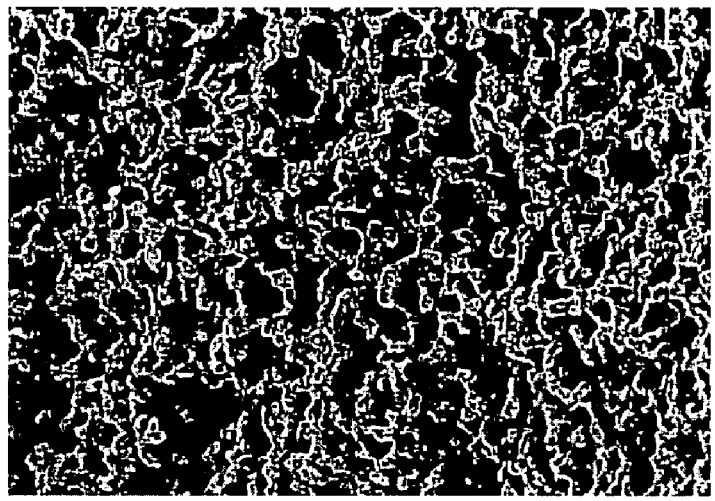
FIGS. 3A and 3B are SEM micrographs of porous carbon material as used for an electrode in accordance with the invention, FIG. 4 and subsections (a) and (b) thereof show SEM images of HPCM-1 at low and high magnification; subsections (c) and (d) thereof show PANI+HPCM-1 at low and high magnification; subsection (e) thereof shows NPCM; and subsection (f) thereof shows PANI+NPCM.
Figure 3B:
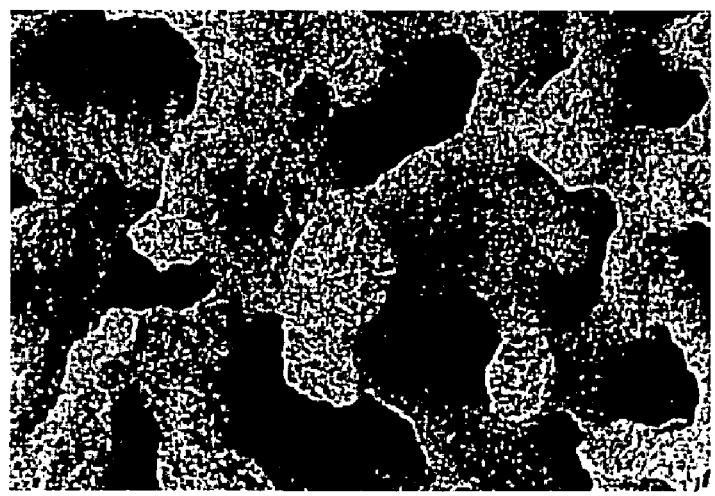

One way of looking at this is to consider a section through the material, e.g. as shown in FIGS. 3A and 3B. The large black areas shown in FIGS. 3A and 3B are the pores in the first size range, the first pores, defined here as being the range from 10 μm to 100 nm. For each black area a maximum length dimension L and a maximum width dimension W in the plane of the section can be estimated and the value of (L+W)/2 taken as an average size.

Alternatively, the area of each black area can be estimated and equated to the surface area of a circle having a surface area of $\pi r^2$, with the resulting value of 2r being taken as the average size. Both methods tend to lead to comparable results for the average size of the pore. Precisely the same concept can be used for the second pores which are also irregular and largely interconnected in three dimensions.

Also it can easily be seen from FIGS. 3A and 3B that the walls between the pores in the first size range, i.e. the material of the walls of the structure bounding the interconnected first pores, which has the pores in the second size range, generally have thicknesses comparable to the average sizes of the pores in the first size range. As a result of the presence of the interconnected second pores in this material and the large number of these second pores in the second size range, the average thickness of solid material between the interconnected second pores tends to be comparable with the average size of the pores in the second size range.

Such structures typically have a ratio of the total volume of the pores in the first size range to that of the pores in the second size range as herein defined in the range from 2 to 12. Such structures have been found to have extremely beneficial properties. The amount of carbon material to pore volume provides for maximum exploitation of the carbon material, e.g. in the sense that a maximum amount of Li can be reversibly absorbed in an Li-ion battery or in the sense that a large exploitable catalytic surface is available in a fuel cell or other catalytic converter. The size range of the first pores provides for good transport of an active fluid through the porous material thereby providing access of the liquid or gas to the active material. The pores in the second size range make the active material readily accessible to the material being transported, e.g. enabling Li ions to attach to the carbon material and be detached from it again in a supercapacitor.

Again it is not necessary for the pores in the first size range to have sizes throughout the size range although in practice this tends to be the case although the majority of the first pores have a size in the range from 500 nm to 5 μm and an average size, e.g. as estimated by one of the methods given above, of about 1 μm. Pores with sizes greater than 10 μm are not considered desirable because such sizes tend to reduce the amount of active material present in a unit volume, thus reducing the performance of the material. For this reason smaller first pore sizes are preferred, e.g. 1 µm, providing this allows adequate access of the relevant fluid to the active material. Smaller pore sizes for the first pores than 500 nm tend to increase the amount of active material available per unit volume and also tend to make the wall thicknesses between adjacent first pores smaller, facilitating access to the finer second pores. They can thus be beneficial down to the bottom size of the range given of 100 nm providing they do not undesirably impede the transport of the fluid involved to the smaller pores.

The use of a material with graphene stacks is particularly beneficial, not just because of the favorable poor structure but also because the graphene stacks result in a degree of electronic conductivity of the interconnected porous structure.

One other point that is important for the material of the present invention is the so-called H/C atomic ratio. This ratio depends on the precursor that is used and also on the temperature at which the material is pyrolyzed. For temperatures in the preferred range of 600° C. to 1000° C. the H/C atomic ratio lies in the range from about 30% to about 1%. Ratios of around 20% have been found to be particularly useful.

Figures 10A, 10B:
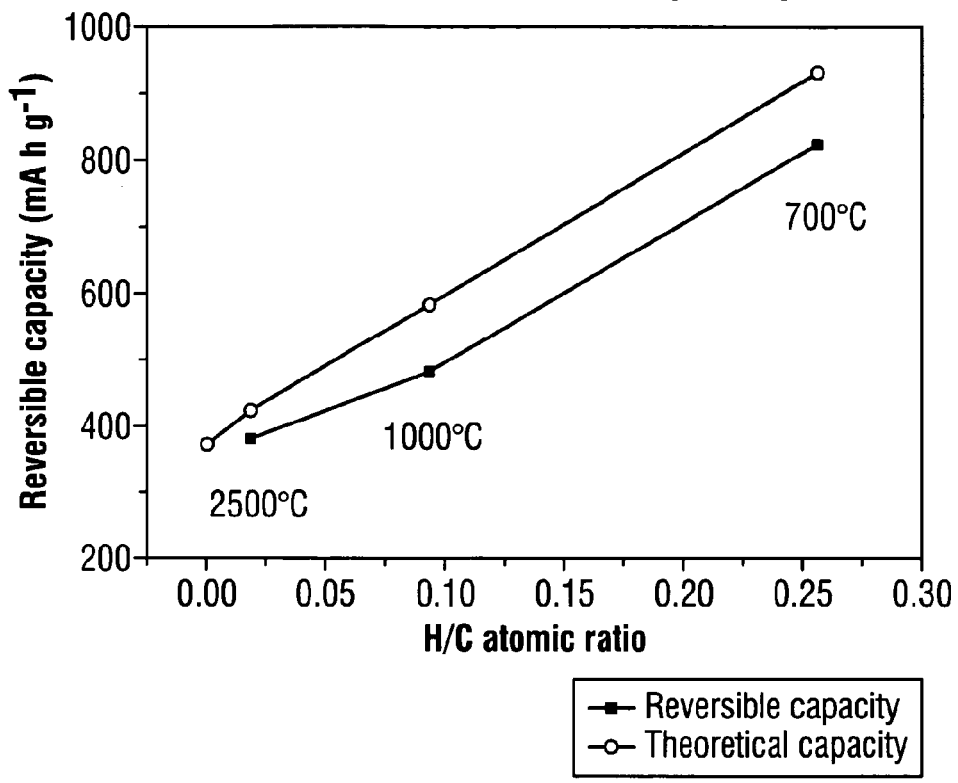
FIGS. 10A and 10B show parameters of carbon monoliths made from mesophase pitch as a function of the H/C atomic ratio and parameters of the same monoliths as a function of different pyrolysis temperatures, which shows how the temperature range of 600° C. to 1000° C. leads to beneficial results.

Preferred parameters for porous carbon monolith prepared from mesophase pitch can be seen in the table of FIG. 10B. The graph of FIG. 10A shows how the reversible storage capacity in mAh/g is related to the H/C atomic ratio for the same material with reference to different pyrolysis temperatures. FIG. 10A also compares the reversible storage capacity to the theoretical reversible storage capacity.

It should also be noted that values of the H/C atomic ratio around 0.2 to 0.075 may be beneficial.

Mesophase pitch is a particularly beneficial starting material, i.e. precursor for the formation of the porous carbon material presently proposed. One characteristic of mesophase pitch, which is chemically derived from naphthalene, is that it has a pronounced diffraction peak in the 2θ diffraction plane at 26.5° which shows there is some degree of ordering present similar to that of graphite in the [002] plane. Generally it is found that precursors suitable for making the carbon material of the present invention can be any organic material or organometallic material having a pronounced diffraction peak at 26.5°.

Figure 9A:
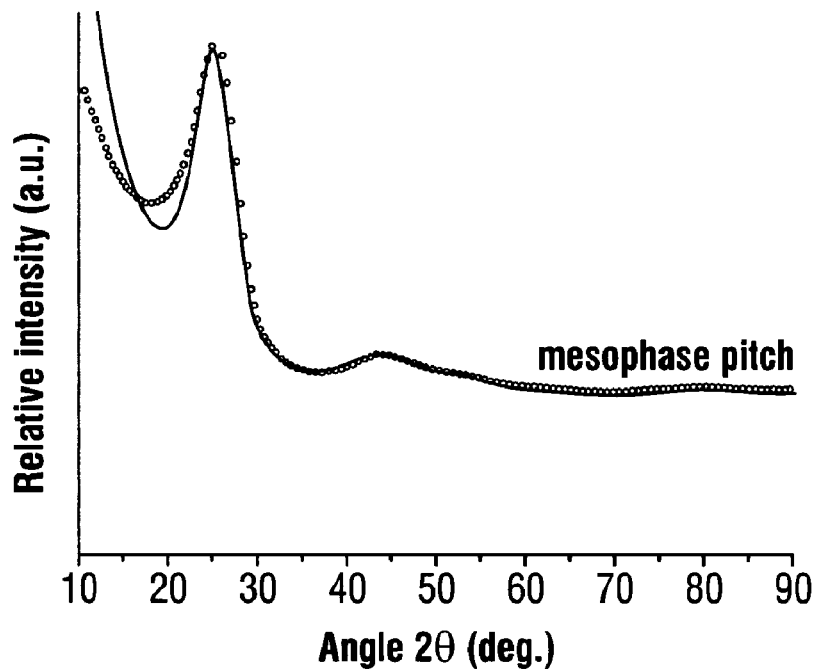
FIGS. 9A and 9B show X-ray diffraction curves for mesophase pitch, with FIG. 9A showing the curve for the raw material with a pronounced 2θ peak at 26.5° for a CuKα source and FIG. 9B showing similar diffraction curves for the same material after pyrolysis at different temperatures.
Figure 9B:
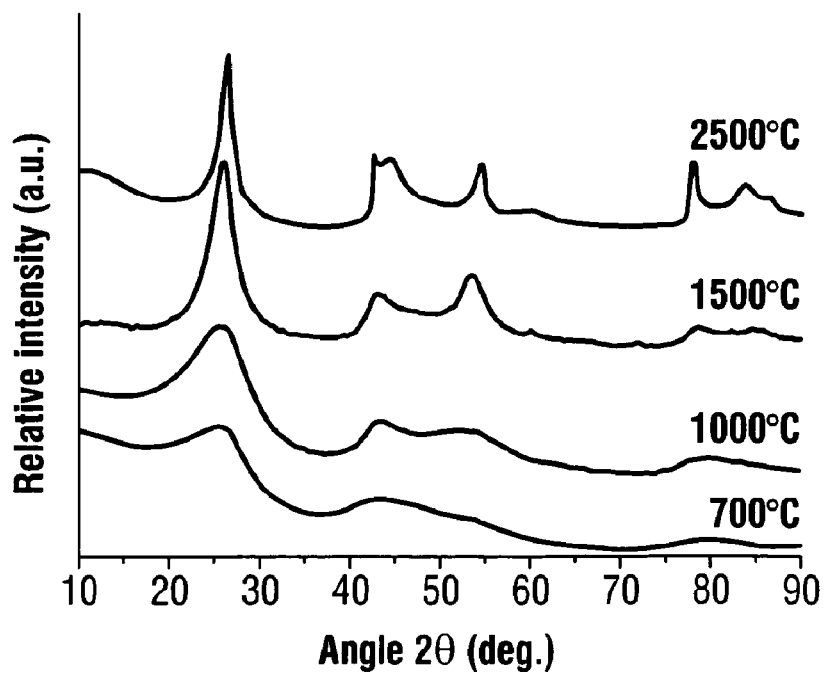

FIGS. 9A and 9B show such a diffraction curve for mesophase pitch (mesophase pitch (AR) from Mitsubishi). Should an organic material or an organometallic material or an improved form of mesophase pitch be developed with a sharper 2θ peak than mesophase pitch AR, then this should also be beneficial as a precursor for the carbon material of the present invention.

Figure 2A:
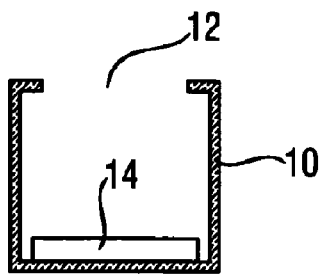
FIGS. 2A to 2F are a series of sketches explaining the method in accordance with the invention.

Referring now to FIGS. 2A-2F, a first method of making a carbon monolith will be described. FIG. 2A shows a glass beaker 10 with an open top 12 and a rod-like $SiO_2$ monolith 14 resting on the bottom of the beaker. The $SiO_2$ monolith is porous, having pores in two different size ranges, and is fabricated in the manner known from the prior art, for example in the papers by K. Nakanishi and N. Soga in *Am. Cerm. Soc.*, 1991, 10, 2518; N. Tanaka, H. Kobayashi, N. Ishizuka, H. Minakuchi, K. Nakanishi, K. Hosoya and T. Ikegami in *J. Chrom. A*, 2002, 965, 35 and M. Motokawa, H. Kobayashi, N. Ishizuka, H. Minakuchi, K. Nakanishi, H. Jinnai, K. Hosoya, T. Ikegami and N. Tanaka in *J. Chrom. A*, 2002, 961, 53.

Figure 2D:
Figure 2B:
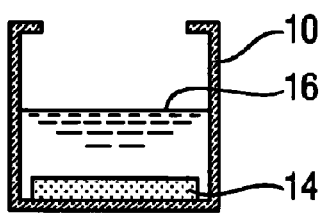
Figure 2E:
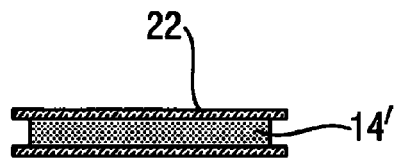

As indicated in FIG. 2B, the $SiO_2$ monolith 14 is then impregnated by adding mesophase pitch dissolved in THF (tetrahydrofurane) into the beaker 10 so that the dissolved mesophase pitch can gradually fill all the pores, which is favored by the capillary action of the $SiO_2$. In order to dissolve the mesophase pitch (Mitsubishi AR) in THF, the mixture is subjected for 20 min to ultrasonic agitation (100%) and shaking on a horizontal shaker at low intensity. Alternatively, any other shaker or magnetic stirrer can be used. After shaking for about 3 days, the resultant mixture is centrifuged, for example for 10 min at 6500 rpm. The solution is used for the infiltration/impregnation process. The not yet dissolved mesophase pitch can be reused. The ratio by mass of the mesophase pitch solution (the carbon precursor) to the $SiO_2$ is preferably 80:1.

Figure 2C:
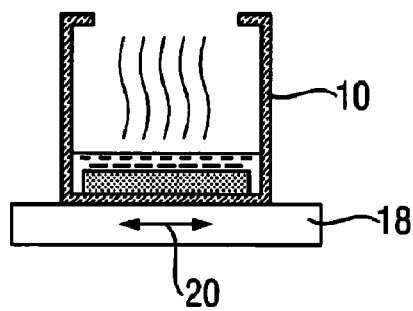
Figure 2F:
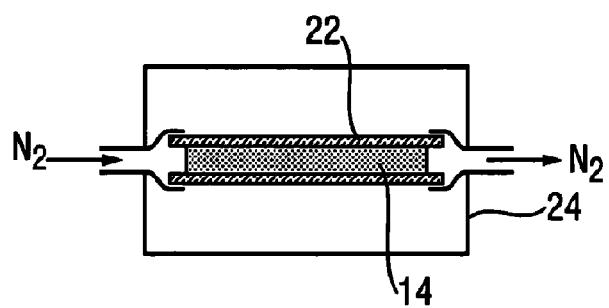

Thereafter, in accordance with FIG. 2C, the glass beaker containing the $SiO_2$ monolith and the mesophase pitch solution is placed on a shaker 18 and the solution is concentrated by evaporating the THF while subjecting the beaker and the $SiO_2$ monolith to horizontal shaking (double arrow 20) at room temperature. This ensures the pores are completely infiltrated with mesophase pitch.

Thereafter, after evaporation of the THF, in accordance with FIG. 2D, the $SiO_2$/mesophase pitch hybrid body 14', i.e. the infiltrated monolith, is placed in a quartz tube (22, FIG. 2E) and left to dry for about one day. The quartz tube should be slightly larger than the monolith and should surround it. Without the quartz tube or other adequate support, such as a metal container, there is a danger that the monolith will deform or crack.

The infiltrated monolith is then carbonized in an oven (24, FIG. 2F) in the quartz tube in an $N_2$ or other inert gas atmosphere at a temperature between 600° C. and 1000° C., which results in the desired structure of the non-graphitic carbon material supplied in the form of the mesophase pitch. The heating rate should be 1.5° K/min with a 6 hour plateau at a carbonization temperature in the range 600° C. to 1000° C.

Thereafter, the monolith is dipped in a bath of a solvent for the silicate template. The solvent can be 4M ammonium hydrogen difluoride in water in an amount of 100 ml solvent for 0.1 g $SiO_2$. Alternatively, the solvent can be a sodium hydroxide-EtOH—$H_2O$ solution at 100° C. After being horizontally shaken for about 3 days (gentle to and fro movement), the solution is poured away and the monolith is rinsed once with water. For complete removal of the ammonium hydrogen difluoride, the monolith is shaken to and fro on the horizontal shaker in demineralized water. Thereafter, all the liquid is poured away, and the monolith is rinsed again and dried for 2 hours in an oven at 100° C. After removal of the silicate template and drying, the carbon monolith with hierarchical porosity is ready for use.

FIGS. 3A and 3B show two SEM images of a carbon monolith made in accordance with FIGS. 2A-2F using mesophase pitch as the carbon precursor. FIG. 3B is drawn to a larger scale than FIG. 3A and is in fact magnified by a factor of approximately 5 relative to FIG. 3A. The network-like support system and the interconnected passage system, shown in black in FIGS. 3A and 3B, can be clearly recognized and this system is a 1:1 copy of the skeleton of the corresponding silicate structure; i.e. the shape of the silicate skeleton has been preserved in the form of the passages of the carbon monolith from which FIGS. 3A and 3B were prepared. The pore transport system present between the webs, the lighter areas in the images, has a well-defined mesh width here of ca. 2-5 µm. The fine pores of the carbon system are not readily visible in the images of FIGS. 3A and 3B, however, they are indicated by the grainy nature of the lighter areas in FIG. 3B, i.e. of the carbon material. Depending on the dimensions of the silicate structure, pore volumes can readily be achieved in the range from 0.4 to 0.8 $cm^3/g$ when using mesophase pitch as the starting product. Moreover, the conditions described in relation to FIGS. 2A-2F lead to a specific surface of ca. 300 m$^2$/g. After removal of the silicate template, the carbon monolith can be dried and is ready for use. The monolith typically has first pores in the size range 10 µm to 100 nm, second pores in the size range from less than 100 nm to 1 nm, a specific surface of approximately 300 m$^2$/g and a total pore volume of approximately 0.4 cc/g.

It seems that the carbon precursor has to be carefully selected in order to achieve an appropriate non-graphitic carbon structure. This is certainly possibly using "mesophase pitch" with preconjugated carbon units as the precursor. The manufacturing process for the new carbon material is moreover simple (one-step infiltration/impregnation at room temperature). The starting materials are favorably priced and the carbon monoliths that are produced are crack-free. They can readily be scaled up to any size that is desired.

An alternative method of preparing suitable porous carbon materials having first pores in the size range from 10 µm to 100 nm and second pores in the size range from less than 100 nm to 3 nm, a specific surface area in the range from 50 m$^2$/g to 800 m$^2$/g and a pore volume in the range from 0.1 to 1.0 cm$^3$/g will now be described.

In this alternative method (not shown) a porous SiO$_2$ monolith is heated in an oven to 200° C. A naphthol solution is poured over it for a short period of time while the monolith is at 200° C. The naphthol solution, which forms the carbon precursor, is manufactured from naphthol, ethanol and sulphuric acid in a ratio by weight of naphthol:ethanol:H$_2$SO$_4$ equal to 1:3.5:0.15. To prepare this solution, the naphthol is first dissolved in the ethanol and the H$_2$SO$_4$ is then added and the components are then mixed for 30 min with a magnetic stirrer. The naphthol solution infiltrates the monolith. The whole monolith is covered completely with the precursor solution, and immediately thereafter the solution is removed with a pipette. In this way a situation is achieved in which only a small proportion of the solution penetrates into the monolith. The so-infiltrated monolith is then left for 30 min in the oven at 200° C. At 200° C. the ethanol vaporizes and the naphthol carbonizes. This process can be repeated 3 to 4 times to increase the quantity of carbonized naphthol in the monolith. In the end, a stable monolith is obtained. Less frequent infiltration leads to higher porosity (surface area ~2500 m$^2$/g) but more unstable monoliths. The hybrid body comprising the SiO$_2$ matrix and the carbonized naphthol is then heated to a higher temperature such as 800° C. More specifically, it can be heated at a heating rate of 1.5° C./min and held at a plateau of 600° C. to 1000° C. for six hours. Thereafter, the SiO$_2$ is removed using an NaOH or HF solution. A macroporous/mesoporous carbon material remains with a surface area of ca. 800 m$^2$/g.

In a further possible and generally applicable method, a porous carbon material having first pores in the size range from 10 µm to 100 nm and second pores in the size range from less than 100 nm to 3 nm, a specific surface area in the range from 50 m$^2$/g to 800 m$^2$/g and a pore volume in the range from 0.1 to 1.0 cm$^3$/g and suitable for the present invention can be prepared using the following techniques.

This general method is based around the concept of manufacturing a mixture which contains at least one carbon precursor and an organic polymer in an organic solvent, and vaporizing the solvent until a viscous or highly viscous composition or a corresponding shaped body is obtained, with subsequent pyrolysis of the composition of the shaped body at temperatures between 600° C. and 1000° C. Pitch, in particular mesophase pitch, is preferably used as the carbon precursor. The organic polymer can be polystyrene. A Lewis acid can be added to the mixture during its preparation. The heating of the shaped body preferably takes place initially to temperatures between 200° C. and 400° C. and then to temperatures between 500° C. to 1000° C. Many variations of the method are possible. For example, the mixture, which is initially prepared, can contain two or more different organic polymers of different molecular mass or one organic polymer with two or more different molecular masses. One or more softeners can be added to the mixture. The mass or composition which is formed can be shaped by extrusion.

Basically, all substances can be used as carbon precursors which produce directly, or after the carbonization or pyrolysis, a three-dimensional structure which consists predominantly of carbon. Examples for such carbon precursors are pitches, in particular mesophase pitch, but also naphthene or other organic compounds or organo-metallic compounds can be considered providing they show a pronounced 2θ diffraction peak at 26.5° using an appropriate source such as a CuKα source. The carbon precursors can be used individually or as a mixture of two or more carbon precursors.

The term "pitch" includes all viscous to solid tar-like or bituminous fusible materials which remain, for example, after pyrolysis or distillation of organic materials (natural substances), or of coal tar or bituminous tar. In general, pitches consist of high molecular cyclic hydrocarbons and hetero-cycles which can have a molecular mass of up to 30,000 g/mol.

Mesophase pitch is a type of pitch which consists of various, principally aromatic hydrocarbons and contains anisotropic liquid crystalline regions. A review concerning the manufacture and characteristics of mesophase pitch is provided by Mochida et al., *The Chemical Record, Vol.* 2, 81-101 (2002). Mesophase pitch can, for example, be purchased from the Mitsubishi Gas Chemical Company.

As organic polymers it is possible to use all organic polymers with a solubility parameter in accordance with Hildebrandt between 8 and 12. In the same way, the term "organic polymer" will be understood to mean mixtures of two or more corresponding organic polymers which can have different molecular masses or the same molecular masses. Furthermore, mixtures can be used as the organic polymer, which have an organic polymer in two or more different molecular masses. The term "organic polymer" will also be understood to include copolymers or block polymers, such as for example polyoxyethylene glycolether ("Brij" tensides) or poly(ethylene oxide)-β-poly(propylene oxide). In a preferred embodiment polystyrene is used as the organic polymer. The molecular mass of the polymers used typically lies between 500 g/mol and 1,000,000 g/mol, preferably between 10,000 and 500,000 g/mol. In principal, polymers with molecular masses above 500,000 to 1,000,000 g/mol can be used. It was, however, found that polymers with larger molecular masses easily precipitate during the removal of the solvent and can thus disturb the phase separation inherent in the manufacturing method under discussion. If mixtures of different polymers or mixtures of a polymer with different molecular masses are used, then a mixture is preferably selected of an organic polymer with a molecular mass between 500 and 10,000 g/mol and an organic polymer with a molecular mass between 50,000 and 500,000 g/mol. Through the choice of the organic polymer and its molecular mass, or the mass distribution using polymer mixtures, it is possible to exert an influence on the later pore distribution in the shaped body. The molecular mass and the molecular mass distribution determine the demixed structure which arises on evaporation of the solvent and thus the porosity. Smaller molecular masses lead to later demixing and thus to smaller pore systems.

All organic solvents or solvent mixtures can be used as the organic solvent, which are able to dissolve the carbon precursor and the organic polymer to an adequate degree. Furthermore, it is advantageous when the solvent can be evaporated as simply as possible. Accordingly, solvents with a low boiling point and/or high vapor pressure are preferred. Examples for suitable solvents are THF or Xylol.

Evaporation signifies in this context the at least partial removal of the organic solvent up to a formation of a shapeable composition. The evaporation can take place by simply allowing the mixture to stand, i.e. by vaporization, or can be accelerated, for example in that a surface which is as large as possible is produced, for example in a shallow container. Alternatively, or additionally, the temperature can be increased or a vacuum can be generated. Melt extrusion signifies in this context the introduction of a concentrated shapeable composition in the described sense into a heatable extrusion plant. The phase separation can be completed in the extrusion plant and/or the burning out of the organic polymer can at least be started there. Through the melt extrusion a shaped body is formed. This is, however, not the only possibility of forming a shaped body; the composition can simply be cast into an appropriately shaped mold.

Pyrolysis signifies in this connection a tempering or temperature treatment, i.e. heating of the composition. As a rule, the organic polymer is at least partly burned out by pyrolysis, i.e. removed or converted into non-graphitic carbon or graphite. Carbonization is also a type of pyrolysis.

Carbonization signifies here the conversion of a carbon precursor into non-graphitic carbon or graphite or both.

In carrying out the process, a mixture is first formed which contains a carbon precursor and an organic polymer in an organic solvent. A quantity of the solvent is not critical in this respect, since it is later removed by evaporation. Suitable mixing ratios (carbon precursor plus organic polymer:organic solvent) typically have weight ratios between 1:100 and 3:1, depending on the solubility of the carbon precursor and of the organic polymer in the organic solvent.

The mixture, which contains a carbon precursor and an organic polymer in an organic solvent, is preferably a solution. The mixture can, however, also include small proportions of undissolved carbon precursor and/or organic polymer without this disturbing the further conduction of the process. Furthermore, non-soluble substances, such as inorganic pigments, particles or the like, can be added to the mixture.

The mixture in accordance with the invention can also be an emulsion. Here, the terms "dissolve" or "dissolving" are used in conjunction with the manufacture of the mixture which contains at least one carbon precursor and at least one organic polymer in an organic solvent. However, these terms do not mean that 100% of the substances are dissolved, but rather that a part of the substances has been dissolved, for example preferably 70 to 95%. If only a smaller proportion of the components is dissolved, then the total or predominantly remaining part of the non-dissolved material can be separated by filtration or centrifuging or by decanting. The carbon precursor and the organic polymer are, however, preferably fully dissolved. The carbon precursor and the organic polymer can first be separately dissolved in the organic solvent and subsequently mixed, or can be directly dissolved at the same time or after one another in the organic solvent. Generally, it is more expedient to dissolve the carbon precursor and the organic polymers separately in the organic solvent and then to mix them, since in this way the dissolution characteristics of the components can be better taken into account. For example, when using pitches such as mesophase pitch, it can transpire that these components cannot be fully dissolved in the quantity of solvent provided. The operator can then decide whether to increase the quantity of solvent or to simply use the dissolved material by separating it from the non-dissolved material. Dissolving can be assisted by technical means, such as heating, stirring or ultrasonic treatment.

If initially separate solutions of the carbon precursor and the organic polymer are produced in the organic solvent, then the preferred concentrations for these solutions are 10-70% by weight, in particular 40-70% by weight, for a carbon precursor and 10-60% by weight, preferably 30-60% by weight, of the organic polymer. The volume relationships between the carbon precursor and the organic polymer are determined by the desired macroporosity. Typical volume ratios between the carbon precursor and the organic polymer lie between 1:0.1 to 1:10 and preferably between 1:0.5 and 1:4.

If the two solutions are formed separately, then they are substantially united with vigorous stirring to ensure full mixing. The carbon precursor and the organic polymer can also be dissolved in different solvents if, after uniting the two solutions, the final mixture is adequately homogenous and no precipitation of one of the components is observed.

Further substances can be added to the mixture of the organic solvent, carbon precursor and/or organic polymer. These can, for example, be substances which influence the later demixing, such as softeners, further solvents, tensides, substances which influence the later carbonization behavior such as, for example, Lewis acids like $FeCl_3$, or Fe, Co, Ni or Mn, or substances which influence the material characteristics of the later shaped body. When Lewis acids are added, then these are preferably added in a quantity which corresponds to 0.1 to 10% by weight of the carbon precursor.

The at least partial phase separation which is aimed at for the formation of the macroporous structures can take place both during evaporation of the solvent and also during later mechanical or thermal treatment, for example melt extrusion. As a rule, the phase separation already starts during the evaporation of the solvent and is continued during later mechanical and/or thermal treatment.

In just the same way an extraction step can be carried out prior to heating of the shaped body. This extraction step can serve for the extraction of an organic solvent which is difficult to remove completely by allowing the solvent to vaporize or, however, for the removal of at least a part of the organic polymer. Thus, the extraction step can fully or partly replace the pyrolysis of the organic polymer. The extraction can take place with all aqueous or typically organic solvents or solvent mixtures. Depending on the purpose of the extraction, the person skilled in the art is able to select suitable solvents.

During the heating or pyrolysis, the organic polymer remaining in the composition is burned out or also carbonized and in this way generates a pore structure. Depending on the organic polymer the situation can be such that the organic polymer is almost fully burned out or, however, that a certain proportion of residues (principally carbon residues) from the organic polymer remains in the carbon-containing material or shaped body following pyrolysis.

Moreover, during the heating or pyrolysis, the structure of the carbon precursor changes. For the pitch or mesophase pitch which is preferably used as a carbon precursor a certain ordering of the material takes place during the temperature treatment. Through the temperature treatment, the graphenes grow laterally and the graphene stacks grow vertically. Moreover, the degree of order of the graphene stack increases.

It has been found that the higher the carbonization temperature and the more complete the carbonization, the more the total porosity reduces, with the porosity given by pores in the second size range reducing more strongly. The heating can take place while precluding oxygen, i.e. under an inert gas atmosphere, such as one of the noble gases or nitrogen. In a preferred embodiment the heating of the shaped body takes place in steps, with it being heated initially to temperatures between 200° C. to 400° C. and subsequently to temperatures between 500° C. and 1000° C.

The first tempering to 200° C. to 400° C. serves for the preliminary cross-linking of the carbon precursor and thus the generation or ripening of the demixing structure which is of importance here. Typically this temperature is held for a period from 1 hour to 48 hours.

In a second tempering step the shaped body is then heated to temperatures between 500° C. and 1000° C. Here, the duration of the heating and the level of the temperatures determine how completely the carbonization is to be carried out. In particular, the duration of the carbonization and the temperature curve during the carbonization make it possible to exert an influence on the material characteristics, such as the proportion of carbon and the porosity.

During the at least partial evaporation of the organic solvent and prior to, during or after the heating of the viscous composition of the shaped body, the latter can be additionally activated. Activation signifies here that the pore structure of the shaped carbon monolith and/or its surface is modified relative to a carbon monolith otherwise produced in the same manner. An activation can, for example, take place by treating the green body prior to heating with substances such as acids, $H_2O_2$, or zinc chloride which attack the structure of the monolith and in particular lead to a change of the pore structure during subsequent heating or chemically change the surface of the shaped body. In just the same way, such substances can also be used during the heating, or heating can take place in an oxygen flux. Such forms of activation in particular lead to the formation of micropores or other chemical functionalization of the surface of the shaped body, for example by the formation of OH or COOH groups by oxidation.

The activated or non-activated carbon monoliths obtained after heating can be used directly or can be previously mechanically or chemically processed. For example, they can be cut by means of suitable saws or provided with specific chemical functionalities by means of chemical derivatization methods, i.e. activated.

It is thus possible at almost every stage of the method to influence the material characteristics of the later carbon monolith by the addition of specific substances or to introduce specific chemical functionalities. It is also possible to add stabilizers, substances to assist in carbonization, inorganic particles or fibers to the solution.

The porous carbon monoliths produced in the above manner have a porosity which can be intentionally set. Through the use of a method in which at least a partial phase separation takes place a bimodal or oligomodal pore structure can be produced. In a bimodal pore structure in which the pores are, in particular, produced by phase separation they can have a bimodal or oligomodal pore structure. With a bimodal pore structure or oligomodal pore structure, the carbon monolith has communicating pores in first and second different size ranges, so that it is possible for liquids to migrate through the interlinked pores in the shaped body in the first size range and reach the pores in the second size range. The size and number of the pores in each of the two size ranges can be determined by the choice of the organic polymer, by its concentration and by its molecular weight. An influence can be effected on the pore size and the pore size distribution also by the duration and temperature of the pyrolysis step. The size of the pores in the second size range can typically be set between 2 and 100 nm, preferably between 5 nm and 30 nm, and the pores in the first size range typically have a size between 100 nm and 5 µm. Total porosities of over 50%, preferably between 60 and 80% by volume, can be produced without problems while preserving the favorable mechanical characteristics.

Through the above-described manufacturing methods, the porosity of the carbon monoliths can be intentionally set over a wide pore size range and a hierarchical pore size distribution can be produced. The specific surface of the shaped bodies produced typically lies above 50 $m^2/g$, preferably above 300 $m^2/g$, with higher values also being obtainable.

A specific example of the above-described method will now be given.

First of all, mesophase pitch (Mitsubishi AR) is dissolved in THF with a weight ratio mesophase pitch:THF of 1:3 which is conducted in a closable vessel. In order to dissolve the mesophase pitch, the mixture is subjected to 20 min of ultrasonic excitation (100%) and shaking on a horizontal shaker at low intensity. As an alternative, any other shaker or magnetic stirrer can be used. After 7 days the mixture is centrifuged (10 min at 6500 rpm). The solution then contains 10% by weight of mesophase pitch. The non-dissolved mesophase pitch can be reused.

In order to introduce the carbonization at low temperatures, a Lewis acid such as $FeCl_3$ is added to the mesophase pitch solution (1-10% by weight $FeCl_3$ related to the solid component in the mesophase pitch solution). The solution is then stirred for 15 min.

The organic polymer, here polystyrene (molecular weight 250,000 g/mol) is then dissolved in THF (weight ratio polystyrene:THF=1:20).

The polystyrene solution is then dropped into the mesophase pitch solution while stirring vigorously. The relative quantity of polystyrene to mesophase pitch determines the final absolute porosity of the material. The finished solution is then stirred vigorously for 30 min.

For the demixing, the solution is then poured into a Petri dish. After evaporation of the THF, a thin layer of polystyrene/mesophase pitch solution remains. The sample is subjected to preliminary cross-linking in the Petri dish for 48 hours at 340° C. and under an $N_2$ atmosphere. Further carbonization is then carried out at 500° C. to 750° C. to preserve the structure and to achieve the desired porosity.

The carbon material which is obtained contains first pores in the size range from 10 µm to 100 nm and second pores in the size range from less than 100 nm to 1 nm, a specific surface area in the range from 50 $m^2/g$ to 800 $m^2/g$ and a pore volume in the range from 0.1 to 1.0 $cm^3/g$, the foregoing values being determined by means of Hg porosimetry and by use of a scanning electron microscope.

In an alternative example, the manufacture of the carbon monolith takes place analogously to the above-described example, but using the following precursor solutions:

Mesophase pitch in THF:
ca. 2 g mesophase pitch (Mitsubishi AR)+10 g THF+0.2 g $FeCl_3$.

Solution of the organic polymers:
1 g Brij 58+20 g THF.

The new carbon material shows a combination of energy storage density, stability and positive charging/discharging speed not previously accessible. Finally, it should be noted that a carbon material formed in this way and carbonized at 2500° C. leads to a porous graphite having just first pores in the size range from 10 µm to 100 nm and has an electrochemical behavior more like that of graphite. However, it does show a much better rate performance than commercial graphite.

Turning now to the further figures, the specific samples of carbon material with hierarchical porosity that have been investigated and coated with PANI will now be described. More specifically, two samples were prepared which will be designated HPCM-1 and HPCM-2. For comparison purposes, samples of a non-porous carbon monolith (NPCM) were also prepared. These samples were prepared in the following way:

HPCM-1 and HPCM-2 were prepared by a nanocasting technique using silica monolith as a hard template. "Mesophase Pitch" (MP, Mitsubishi AR) was used as the carbon precursor for HPCM-1. Infiltration was performed with a concentrated precursor solution of MP in THF. MP was mixed with THF in a closed vessel in a ratio of 1:3 by weight. The mixture was first ultrasonicated for 20 min and then shaken vigorously for 3 days. The resulting dispersion was centrifuged, and the MP saturated supernatant was used for infiltration. The solution contains then about 10 wt % of the mesophase pitch. Due to capillary action, the silica monoliths can easily be filled with this solution. The silica monoliths were infiltrated in an open vessel on a horizontal shaker and were removed after almost complete evaporation of the solvent. The loaded monoliths were dried overnight in air. Finally, the MP was condensed and carbonized at 1000° C. for 6 hours under nitrogen in quartz tubes supporting the outer shape to avoid deformation and cracking of the monolith. To remove the templating $SiO_2$ scaffold, the monolith was treated for 3 days with a 4 M ammonium hydrogenfluoride solution. HPCM-2 was simply made by impregnation of the silica monolith with a 20 wt % β-naphthol solution in ethanol and subsequent drying at 100° C. The monolith was filled three times that way. $H_2SO_4$ was added as catalyst to the solution. All the other steps were performed as for HPCM-1.

HPCM rods and NPCM rods were cut into small pieces (HPCM: diameter 4 mm, thickness 1 mm; NPCM: diameter 5 mm, thickness 1 mm). Aniline and sulfonic acids from Merck were used as received and dissolved into doubly distilled water. Electrochemical deposition and characterization of polyaniline were carried out in a one-compartment cell connected to a solartron 1255 impedance/gain-phase analyzer coupled with a solartron 1287 electrochemical interface instrument. The HPCM and NPCM were tied on Ni mesh by Platinum wire (Goodfellow) and the remaining part of the Ni mesh was covered by teflon tape. The cell was equipped with a Platinum foil as a counter electrode and a saturated calomel electrode (SCE) as a reference electrode. All potentials reported here have been measured versus SCE. Electrolyte solution consisting of 1 M $H_2SO_4$ and 0.05 M aniline was used for the electrodeposition of PANI. Polyaniline (PANI) was electrodeposited on HPCM at a constant potential of 0.75 V for 15 min for HPCM-1 and 30 min for HPCM-2. The mass ratios of PANI electrodeposited were estimated by the differences of HPCM before and after electrodeposition (26% for HPCM-2) and also elemental analysis (about 1.5% for HPCM-1). Subsequent to deposition, the electrodes were washed with distilled water and then dried at 40° C. The microstructure of the surface and cross-section of the PANI formed on HPCM-1 and NPCM were measured on a LEO 1550 from Zeiss. Electrochemical characterizations of cyclic voltammetry, charge/discharge and impedance were carried out in 1 M $H_2SO_4$ with the same equipment as in the electrochemical deposition.

The sample HPCM-1 carbonized from mesophase pitch at 1000° C. has a surface area of 277 $m^2$ $g^{-1}$ and pore volume of 0.47 $cm^3$ $g^{-1}$. The diameters of mesopores and macropores in HPCM-1 are ~7 nm and 1-4 μm respectively. The electrical conductivity of this HPCM-1 is about 0.1 S $cm^{-1}$ because of a continuous electronic pathway provided by the well-interconnected graphene structure within the walls of HPCM-1. From FIG. 4a the network structure of HPCM can be clearly observed with a fully interconnected macro- and mesoporosity. Such hierarchical networks offer a very good compromise between infiltration rate and surface area. The connecting carbon bridges are nanoporous in themselves (as shown in FIG. 4b).

The term "electrically conductive" as use in relation to the porous carbon material of the present invention such as HPCM-1 means a conductivity comparable to that of a good semiconductor but less than that of a metal, e.g. a conductivity in the range $10^4$ $Sm^{-1}$ to 0.1 $Sm^{-1}$.

Figure 4:
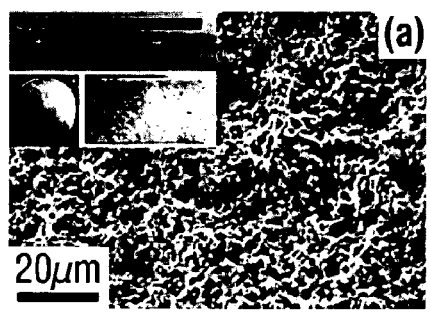
Figure 4:
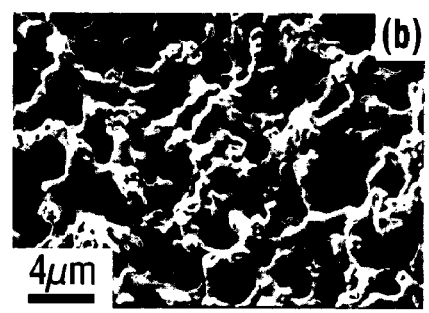
Figure 4:
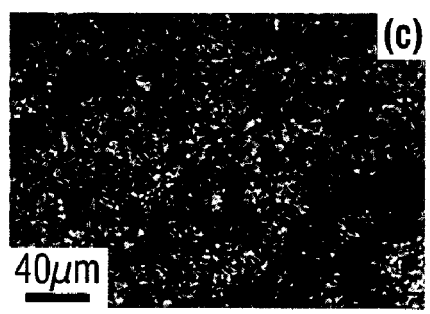
Figure 4:
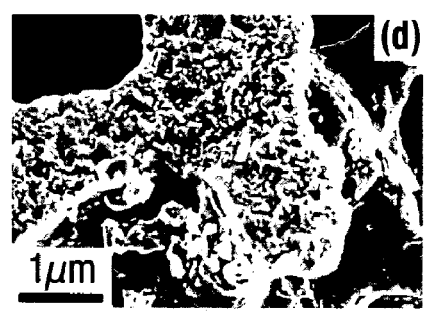
Figure 4:
Figure 4:
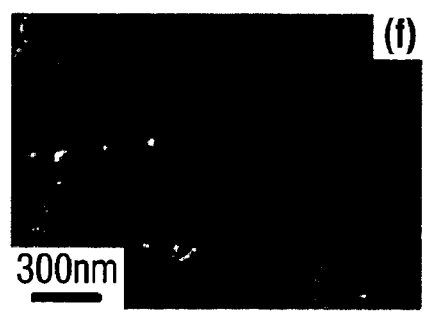

Microstructures of electrodeposited PANI on HPCM-1 are presented in FIGS. 4c and 4d and there the uniform distribution of a porous thin layer of PANI electrodeposited on HPCM-1 can be clearly seen. Most of the PANI particles electrodeposited on the support of HPCM-1 have average sizes of 50 nm. For comparison, PANI was also electrodeposited on a non-porous carbon monolith (abbreviated as NPCM). Instead of nanowires as reported in reference V. Gupta, N. Miura, *Electrochem. Comm.*, 2005, 7, 995, V. Gupta, N. Miura, *Electrochem. Solid State Lett.*, 2005, 8, A630, and V. Gupta, N. Miura, *Mater. Lett.*, 2006, 60, 1466, a more compact and thicker PANI film was found on NPCM (compared with PANI on HPCM-1) owing to the low surface area, while at the same PANI amount (FIG. 1f). The substrate thus has an important effect on the structure and property of active materials.

Figure 5A:
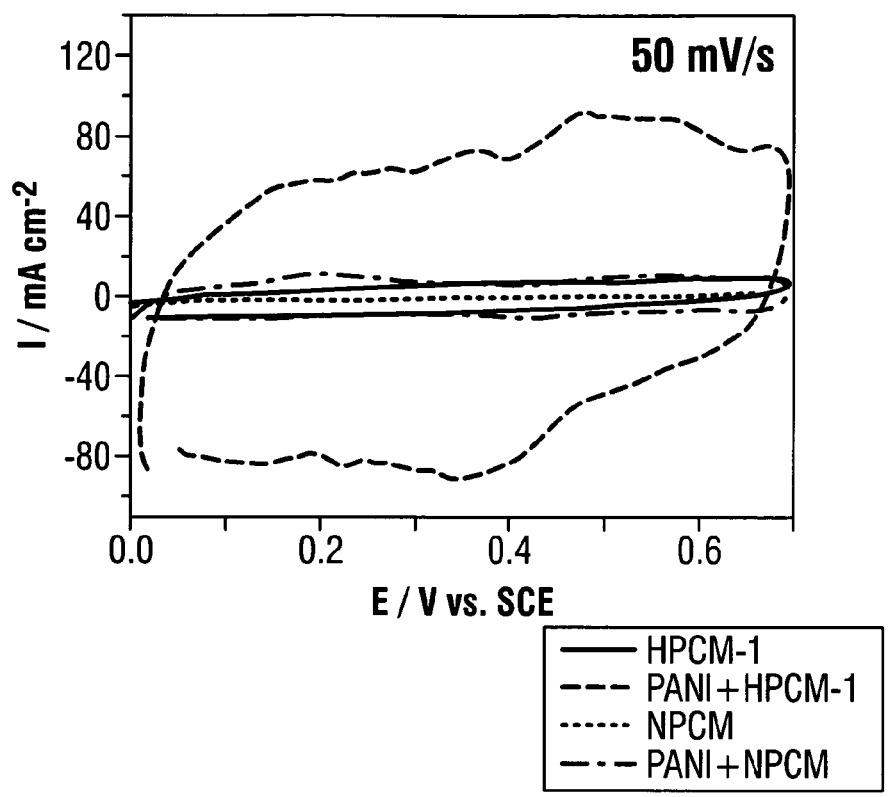
FIGS. 5A-5D show comparisons of cyclic voltammograms of HPCM-1; NPCM; PANI+HPCM-1; and PANI+NPCM at a scan rate of 50 mV/s; charge/discharge curves of PANI+HPCM-1 and PANI+NPCM at 1 mA; their relationship of the $C_{PANI}$ with respect to charge/discharge specific current for HPCM-1, PANI on HPCM-1, and PANI on NPCM; their relationship of the $C_{total}$ with respect to charge/discharge specific current for HPCM-1, PANI+HPCM-1 and PANI+NPCM.
Figure 5B:
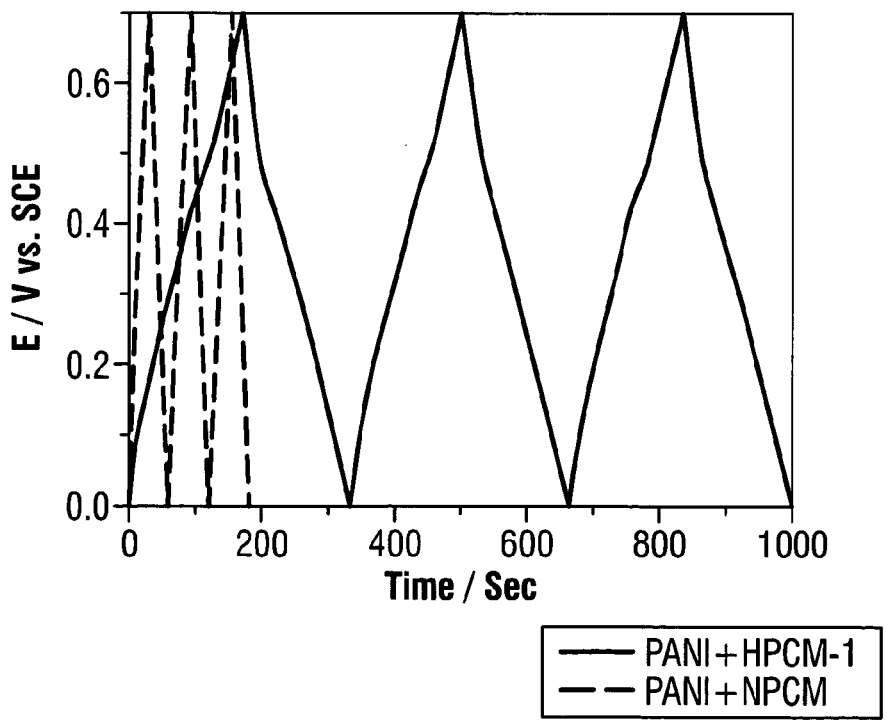
Figure 5C:
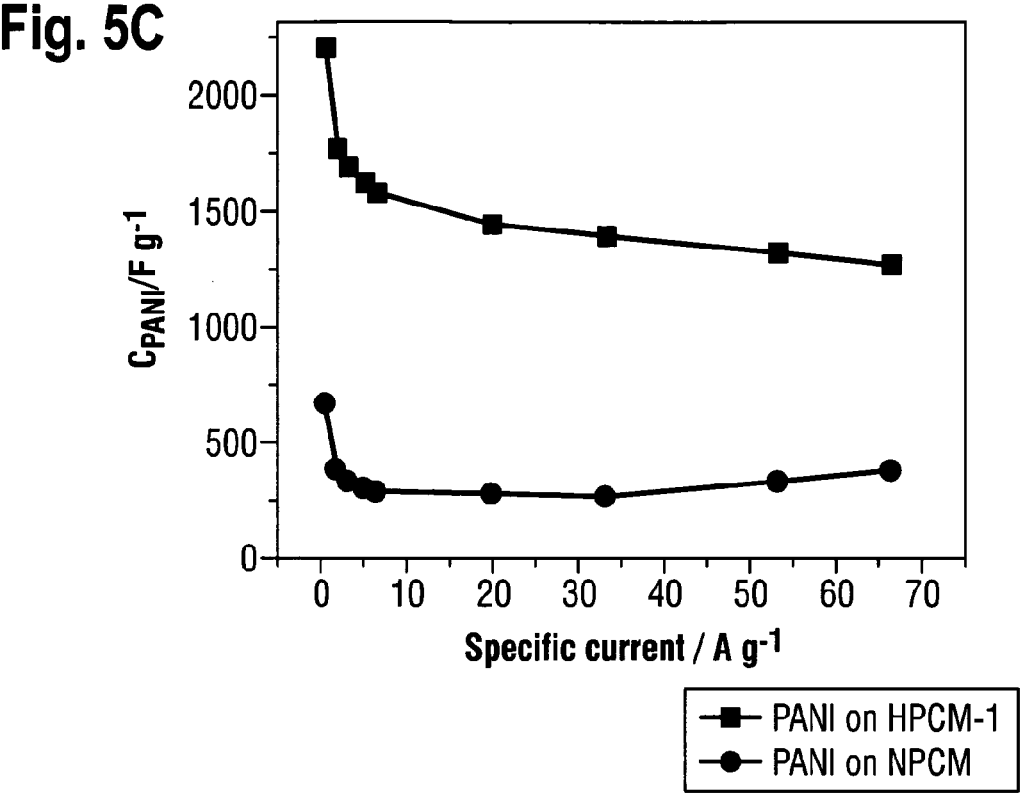
Figure 5D:
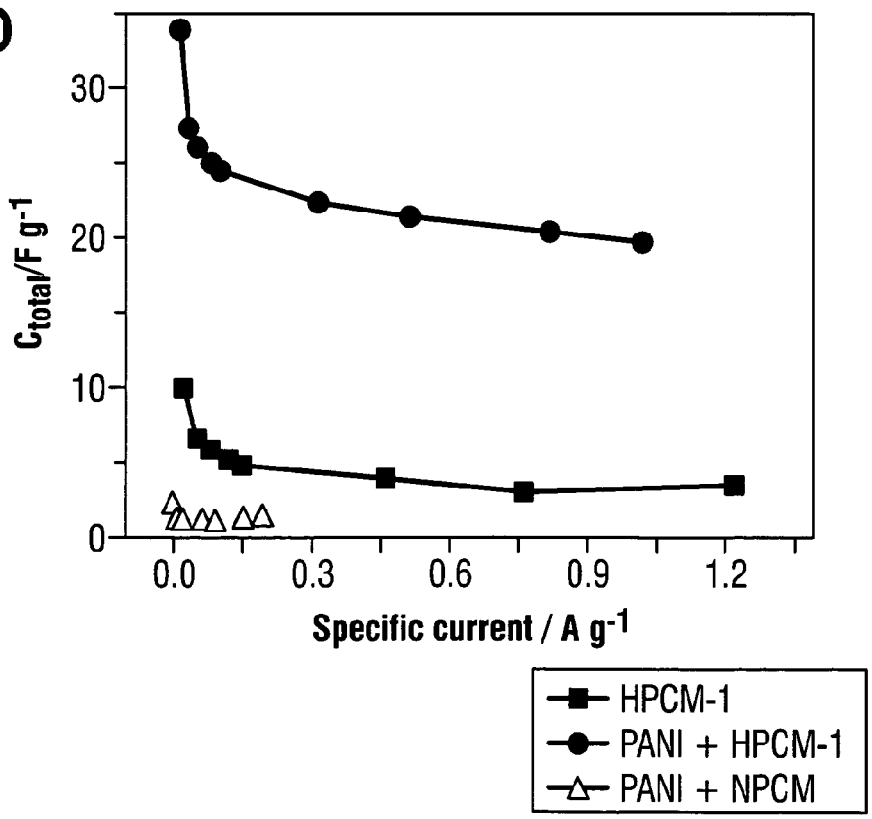

Cyclic voltammetry (CV) at various scan rates from 5 to 500 mV $s^{-1}$ and charge/discharge curves at different current densities was used to characterize the capacitive properties of the PANI-coated samples of FIGS. 4c and 4d. FIG. 5a shows typical CV curves for a three-electrode capacitor in 1 M $H_2SO_4$ at a scan rate of 50 mV $s^{-1}$. The CV recorded for NPCM shows a linear behavior, indicating non-capacitive behavior. Pure HPCM-1 and PANI+NPCM-1 exhibit small rectangular curves, corresponding to low capacitances. The high current response in the CV curve of PANI+HPCM-1 indicates that the capacitive behavior of PANI electrodeposited on HPCM-1 is remarkably improved when HPCM-1 is used as a support instead of NPCM. A couple of vague peaks at 0.47 V (oxidation peak) and 0.4 V (reduction peak) could be attributed to the transformation of different conducting states of PANI. The rectangular-like CV curve of PANI+HPCM-1 indicates that the capacitive response comes from the combination of EDLC and redox reactions. The specific capacitances C are simply calculated from charge/discharge curves according to It/mΔE, where I is the charge/discharge current, t the discharge time, and ΔE voltage difference. In the following, [PANI on HPCM] and [PANI on NPCM] designate the specific capacitances based on the mass (m) of PANI, while [PANI+HPCM] and [PANI+NPCM] refer to the total mass of PANI and carbon support. FIG. 5b shows the straight charge/discharge lines without voltage (IR) drop corresponding to conductive characteristics of PANI+NPCM and PANI+HPCM-1, and also the ideal capacitive nature of the material. FIGS. 5c and 5d present the relationships between specific capacitance and charge/discharge current density. The specific capacitances of pure HPCM-1 and NPCM are ~8 F $g^{-1}$ and negligible respectively. For PANI on HPCM, the specific capacitance is ~2200 F $g^{-1}$ at a current density of 0.67 A $g^{-1}$. Even at the very high current density of 66.7 A $g^{-1}$, the specific capacitance is still as high as 1270 F $g^{-1}$. These values are much higher than previously reported for pure PANI, while for PANI electrodeposited on NPCM, the specific capacitance is much lower and ~700 F $g^{-1}$ and ~400 F $g^{-1}$ at a current density of 0.67 A g$^{-1}$ and 66.7 A g$^{-1}$, respectively. The high values of the specific capacitance for PANI on HPCM at different current densities are due to the unique structure of the HPCM. The network of comparatively large pores in HPCM can facilitate the fast penetration of the electrolyte to the surface of active materials. By using HPCM as a support, the electrodeposited PANI has, surprisingly, not only a smaller particle size, but is also more uniformly dispersed, thus ensuring better utilization of electrode materials.

Figure 6:
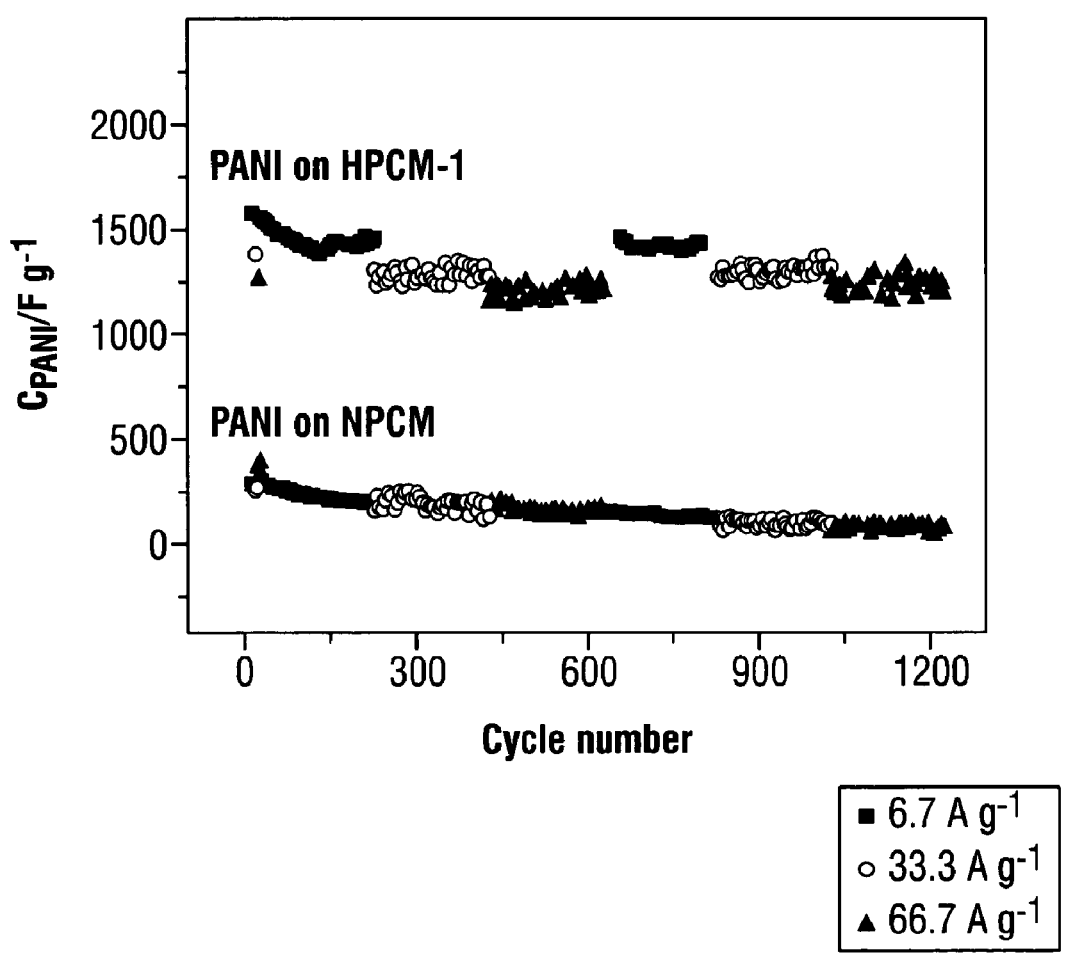
FIG. 6 shows the variation of $C_{PANI}$ with cycle numbers at different current densities for PANI on HPCM-1 and PANI on NPCM.
Figure 7:
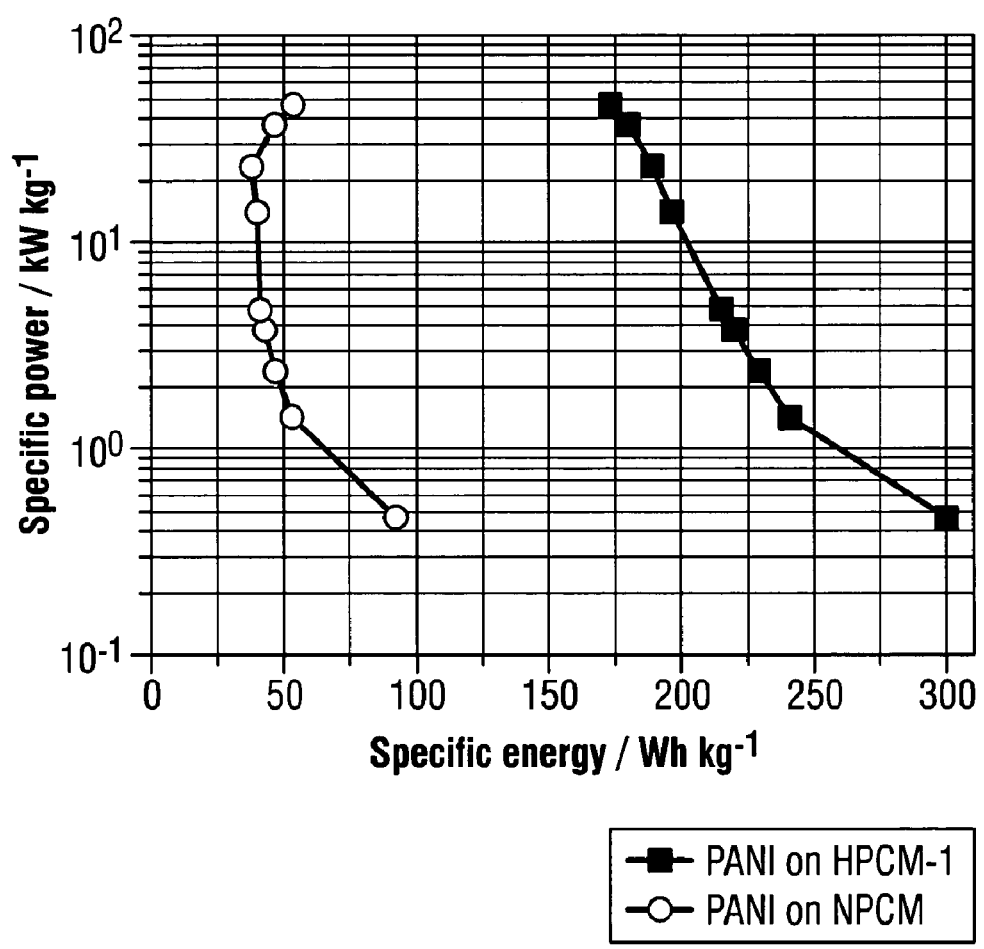
FIG. 7 shows ragone plots for PANI on HPCM-1 and PANI on NPCM.
Figure 8A:
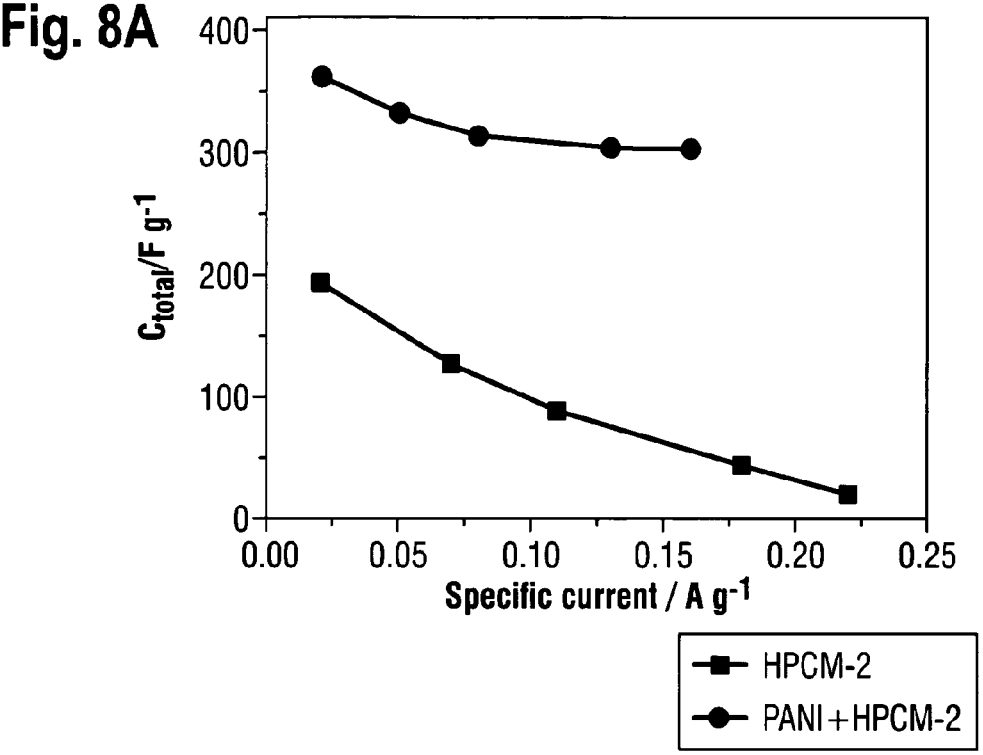
FIGS. 8A and 8B show the relationship of the $C_{total}$ (A) and $C_{PANI}$ (B) with respect to charge/discharge specific current.
Figure 8B:
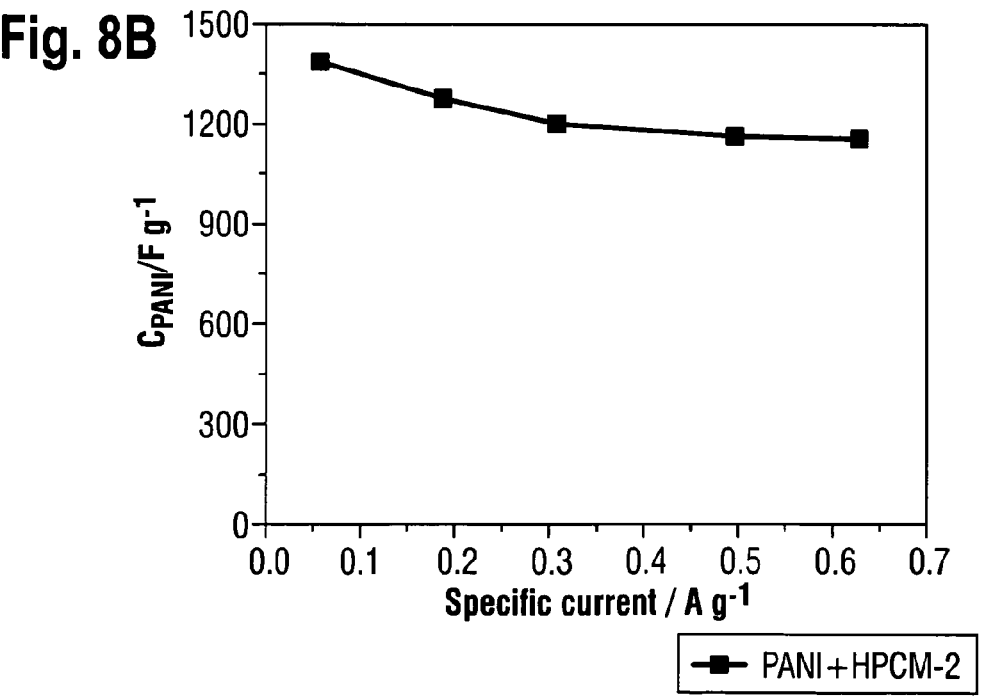

The cyclabilities of PANT on HPCM-1 and NPCM have been evaluated for the same sample which is subjected to different current densities in 1 M H$_2$SO$_4$ by using a three-electrode charge/discharge technique. The cyclability of PANI deposited on HPCM-1 is excellent as shown in FIG. 6. There is only a slight decrease in the specific capacitance value for PANI on HPCM-1 in the first 100 cycles, i.e. from 1580 F g$^{-1}$ to 1420 F g$^{-1}$ at a current density of 6.7 A g$^{-1}$, and thereafter the specific capacitance remains almost constant at ~1420 F/g (~10% loss compared with the first cycle) at a current density of 6.7 A g$^{-1}$, ~1250 F g$^{-1}$ at a current density of 33.3 A g$^{-1}$ and finally ~1200 F g$^{-1}$ at a current density of 66.7 A g$^{-1}$. In contrast to this, for PANT on NPCM the specific capacitances are much lower and do not depend on the current density used. The specific capacitance decreases continuously from ~300 F g$^{-1}$ to ~85 F g$^{-1}$ (~70% capacitance loss). The high cycling stability of PANI deposited on HPCM-1 can also be attributed to the very stable support provided by HPCM. The advantages of HPCM as a support for the deposition of active materials can also be displayed by Ragone plots in FIG. 7. At the same specific power, PANI deposited on HPCM-1 exhibits a much higher specific energy density than that on NPCM. At a specific power of 0.47 kW kg$^{-1}$, the specific energies are 300 Wh kg$^{-1}$ and 92 Wh kg$^{-1}$ for PANI on HPCM-1 and NPCM respectively. At a much higher specific power of 47 kW kg$^{-1}$, specific energies are still as high as 173 Wh kg$^{-1}$ for PANI on HPCM-1, while only 53 Wh kg$^{-1}$ for PANI growth on NPCM.

By using HPCM-1 as a support, a very high specific capacitance of 2200 F g$^{-1}$ ($C_{PANI}$) is thus obtained with a large power density of 0.5 kW kg$^{-1}$ at an energy density of 300 Wh kg$^{-1}$ for PANI, the capacity per mass of composite ($C_{total}$) however being still moderate (FIG. 5d). To test for the importance of graphitization of the carbon monolith, we further applied PANI-modification to HPCM-2 based on naphthol as a support. This monolith, which is essentially built up from disordered aromatic tectons, shows a higher surface area of 1000 m$^2$ g$^{-1}$ and larger pore volume of 2.07 cm$^3$ g$^{-1}$ but also slight lower conductivity of 0.02 S cm$^{-1}$. Diameters of mesopores and macropores in HPCM-2 are the same as in HPCM-1. This HPCM-2 has a much higher specific capacitance of 190 F g$^{-1}$ (FIG. 5a) itself because of its high surface area. However the rate capability (dependence of specific capacitance on current densities) of HPCM-2 is relatively low because of high impedance caused by the higher spa content of this carbon. The typical charge/discharge curves (not shown here) of PANI+HPCM-2 are still straightly linear similar to that of PANI+HPCM-1 in FIGS. 5a and 5b, but a small voltage drop can be observed in PANI+HPCM-2 induced by slight higher impedance of HPCM-2. After deposition of 26% PANI on HMPC-2, it shows a high value of the overall capacitance of 360 F g$^{-1}$ ($C_{PANI}$=1400 F g$^{-1}$) at a current density of 0.02 A g$^{-1}$. This overall capacitance is almost as high as the theoretical value (400 F g$^{-1}$) for carbon with a surface area of 2600 m$^2$ g$^{-1}$ and much higher than the value (200 F g$^{-1}$) for carbon prepared by the introduction of heteroatoms. In the meantime, the rate capability of PANI+HPCM-2 is enhanced (deduced from the slope of two linears). So the electrodeposition of PANT on HPCM-2 can enhance not only the overall capacitance but also rate capability. It is noted that $C_{PANI}$ on HPCM-2 at different current densities are lower than $C_{PANI}$ on HPCM-1 which may be due to the different morphologies and contact areas. The cyclability of PANI+HPCM-2 is also studied at a current density of 0.6 A g$^{-1}$ (per mass of PANI). After 500 cycles, $C_{total}$ and $C_{PANI}$ are 280 F g$^{-1}$ and 1070 F g$^{-1}$, respectively, corresponding to a loss of total 7% compared with the original values ($C_{total}$=302 F g$^{-1}$ and $C_{PANI}$=1156 F g$^{-1}$).

In summary, it has been demonstrated that hierarchically porous carbon monolith is an effective support for the electrodeposition of supercapacitive materials leading to high pseudo-capacitance values. The advantages of this material are: (i) Easy handling compared with powdered carbon; (ii) Binder-free and conductive-agent-free electrode preparation; (iii) Facile and fast synthesis; (iv) Controlled growth of active materials by limited pore spaces; (v) Excellent performance (specific capacitance, power and energy densities, excellent cycling stability). All these characteristics demonstrate that HPCM can be used as a versatile support for electroactive materials. There is still much room to further improve the electrode performances by tuning porosity and composition of porous carbon monoliths.

The invention claimed is:

1. An electrode comprising a conductive carbon material of hierarchical porosity coated with an electrically conductive polymer, wherein the porous electrically conductive carbon material includes graphene stacks and has first and second pores in first and second different pore size ranges respectively, wherein said first pores are of irregular shape in three dimensions, are interconnected to form transport passages through said carbon material and have sizes in the size range from 10 μm to 100 nm, wherein said second pores are defined between neighboring graphene stacks, are of irregular shape in three dimensions, are interconnected, communicate directly or indirectly via other second pores with said first pores and have sizes in the size range from less than 100 nm to 3 nm and wherein said graphene stacks defining said second pores form wall material between said first pores.

2. An electrode in accordance with claim 1, in which, in said porous carbon material, a majority of said second pores have sizes before coating with the electrically conductive polymer in the range from 50 nm to 3 nm, and particularly from 3 nm to 8 nm.

3. An electrode in accordance with claim 2, in which, in said porous carbon material, a majority of said first pores have sizes in the range from 5 μm to 500 nm, and particularly in the range from 2 μm to 500 nm.

4. An electrode in accordance with claim 1, in which, in said porous carbon material the total pore volume comprising micropores with a volume less than 3 nm, the second pores in the size range from less than 100 nm to 3 nm and the first pores in the size range from 10 μm to 100 nm lie in the range from 0.1 to 1.0 cc/g.

5. An electrode in accordance with claim 4, in which, in said porous carbon material, said total pore volume lies in the range from 0.40 cc/g to 0.65 cc/g with the volume of second pores lying in the range from 0.35 cc/g to 0.55 cc/g and the volume of the first pores lying in the range from 0.05 cc/g to 0.1 cc/g.

6. An electrode in accordance with claim 4, in which, in said porous carbon material, the ratio of the total pore volume of the second pores to the total pore volume of the first pores lies in the range from 2 to 12.

7. An electrode in accordance with claim 1, in which the porous carbon material has a BET surface in the range from 50 m²/g to 800 m²/g, especially from 250 m²/g to 350 m²/g and particularly of around 350 m²/g.

8. An electrode in accordance with claim 1 in which said porous carbon material has an H/C atomic ratio in the range from 0.3 to 0.01 and preferably in the range from 0.2 to 0.075 and especially of about 0.1.

9. An electrode in accordance with claim 1, wherein said conductive polymer is polyaniline.

10. An electrode in accordance with claim 1, wherein said conductive polymer is at least one of the following polymers: polypyrrole and polythiophene or a mixture of the foregoing, or a mixture of one or both of them with polyaniline.

11. An electrode in accordance with claim 1, in which the carbon material has been obtained by heat treatment at a temperature in the range from 600° C. to 1000° C. to effect conversion to non-graphitic carbon with a required degree of order.

12. An electrode in accordance with claim 1 in which the carbon material has first pores in the size range from 10 μm to 100 nm and second pores in the size range from less than 100 nm to 3 nm, a specific surface area in the range from 50 m²/g to 800 m²/g, especially around 300 m²/g, and a pore volume in the range from 0.1 to 1.0 cm³/g.

13. An electrode in accordance with claim 12 in which the second pores are defined between neighboring graphene stacks and the first pores are defined by voids in the graphene stacks.

14. An electrode in accordance with claim 1 in which the carbon is present in the form of non-graphitic carbon comprising a plurality of randomly orientated graphene stacks having stack heights in the range from 2 nm to 30 nm and lateral extension values $L_A$ in the range from 2 nm to 8 nm, the graphene stacks either contacting one another or being separated by amorphous carbon usually distributed throughout the structure and present between the graphene stacks in a total amount relative to the graphene stacks material of less than 10% by weight.

15. An electrode in accordance with claim 14 in which the second pores are defined between neighboring graphene stacks and the first pores are defined by voids in the graphene stacks.

16. An electrode in accordance with claim 1 wherein the carbon material is present in the form of a carbon monolith.

17. A method of manufacturing an electrode in accordance with claim 1, wherein the carbon material having a hierarchical porosity is made by carbonizing a carbon monolith precursor having a porosity generating fugitive phase dispersed therein, said fugitive phase comprising particles in at least first and second size ranges, said first size range being from 10 μm to 100 nm and said second size range being from less than 100 nm to 3 nm, subsequently removing said fugitive phase to form a porous carbon monolith having hierarchical porosity with pores in said size ranges and subsequently depositing a conductive polymer on said carbon material having a hierarchical porosity.

18. A method in accordance with claim 17, wherein said fugitive phase is $SiO_2$ and is removed from said heat treated carbon monolith precursor by chemical dissolution.

19. A method in accordance with claim 17, wherein said fugitive phase is polystyrene and is removed during carbonizing of the carbon monolith precursor by vaporization.

20. A method in accordance with claim 17, wherein said carbon precursor is mesophase pitch.

21. A method in accordance with claim 17, wherein said carbon precursor is a naphthol solution.

22. A method in accordance with claim 17, wherein said electrically conductive polymer is potentiostatically electrodeposited on said carbon material and is preferably polyaniline.

23. A method in accordance with claim 22 wherein said electrically conductive polymer is electrodeposited on said carbon material having hierarchical porosity in an electrochemical cell having the carbon material as anode and an electrolyte comprising aniline in sulfuric acid, preferably 0.05M aniline in 1M $H_2SO_4$.

24. A method in accordance with claim 17, wherein said electrically conductive polymer is one of polypyrrole and polythiophene or a mixture of the foregoing, or a mixture of one or both of them with polyaniline.

25. A method of manufacturing an electrode in accordance with claim 1, wherein the carbon material having a hierarchical porosity is made by:
manufacturing a mixture containing at least one carbon precursor and an organic polymer in an organic solvent,
vaporizing the solvent until a viscous or highly viscous composition of a corresponding shaped body is obtained,
shaping the viscous composition into a shaped body, and
heating the composition of the shaped body to a temperature between 600° C. and 1000° C. to form a porous carbon monolith having hierarchical porosity with pores in said size ranges and wherein a conductive polymer is subsequently deposited on said carbon material having a hierarchical porosity.

26. A method in accordance with claim 25, wherein said organic polymer is polystyrene.

27. A supercapacitor incorporating an electrode comprising a conductive carbon material of hierarchical porosity coated with an electrically conductive polymer, wherein the porous electrically conductive carbon material includes graphene stacks and has first and second pores in first and second different pore size ranges respectively, wherein said first pores are of irregular shape in three dimensions, are interconnected to form transport passages through said carbon material and have sizes in the size range from 10 μm to 100 nm, wherein said second pores are defined between neighboring graphene stacks, are of irregular shape in three dimensions, are interconnected, communicate directly or indirectly via other second pores with said first pores and have sizes in the size range from less than 100 nm to 3 nm and wherein said graphene stacks defining said second pores form wall material between said first pores.

28. A supercapacitor incorporating an electrode of carbon material having a hierarchical porosity and made by carbonizing a carbon monolith precursor having a porosity generating fugitive phase dispersed therein, said fugitive phase comprising particles in at least first and second size ranges, said first size range being from 10 μm to 100 nm and said second size range being from less than 100 nm to 3 nm, subsequently removing said fugitive phase to form a porous carbon monolith having hierarchical porosity with pores in said size ranges and subsequently depositing a conductive polymer on said carbon material having a hierarchical porosity.

29. A supercapacitor incorporating an electrode of carbon material having a hierarchical porosity and made by:
manufacturing a mixture containing at least one carbon precursor and an organic polymer in an organic solvent,
vaporizing the solvent until a viscous or highly viscous composition of a corresponding shaped body is obtained,
shaping the viscous composition into a shaped body, and
heating the composition of the shaped body to a temperature between 600° C. and 1000° C. to form a porous carbon monolith having hierarchical porosity with pores in said size ranges and wherein a conductive polymer is subsequently deposited on said carbon material having a hierarchical porosity.

* * * * *